(12) United States Patent
Abe et al.

(10) Patent No.: US 9,771,491 B2
(45) Date of Patent: Sep. 26, 2017

(54) LAMINATED FILM AND METHOD FOR PRODUCING SAME

(71) Applicant: TORAY Industries, Inc., Tokyo (JP)

(72) Inventors: Yu Abe, Otsu (JP); Masami Ogata, Otsu (JP); Yasushi Takada, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 266 days.

(21) Appl. No.: 14/384,063

(22) PCT Filed: Mar. 7, 2013

(86) PCT No.: PCT/JP2013/056292
§ 371 (c)(1),
(2) Date: Sep. 9, 2014

(87) PCT Pub. No.: WO2013/137101
PCT Pub. Date: Sep. 19, 2013

(65) Prior Publication Data
US 2015/0086777 A1    Mar. 26, 2015

(30) Foreign Application Priority Data

Mar. 16, 2012 (JP) ................. 2012-059722

(51) Int. Cl.
| | | |
|---|---|---|
| B32B 27/08 | (2006.01) |
| B32B 27/20 | (2006.01) |
| B32B 27/30 | (2006.01) |
| B32B 27/36 | (2006.01) |
| B29D 7/01 | (2006.01) |
| B05D 3/02 | (2006.01) |
| B05D 7/04 | (2006.01) |
| B05D 7/26 | (2006.01) |
| C08K 3/02 | (2006.01) |

(Continued)

(52) U.S. Cl.
CPC ............. *C09D 133/10* (2013.01); *B29D 7/01* (2013.01); *B32B 27/308* (2013.01); *B32B 27/36* (2013.01); *C08F 220/18* (2013.01); *C09D 133/066* (2013.01); *C09D 133/14* (2013.01); *B05D 3/02* (2013.01); *B05D 7/04* (2013.01); *B05D 7/26* (2013.01); *B05D 2201/02* (2013.01); *B05D 2502/00* (2013.01); *B05D 2508/00* (2013.01); *B29K 2033/00* (2013.01); *B29K 2033/04* (2013.01); *B29K 2033/08* (2013.01); *B29K 2033/12* (2013.01); *B29K 2067/00* (2013.01); *B29K 2105/0005* (2013.01); *B29K 2105/256* (2013.01); *B29K 2995/0051* (2013.01); *B32B 27/08* (2013.01); *B32B 27/20* (2013.01); *B32B 27/30* (2013.01); *B32B 2038/0028* (2013.01); *B32B 2250/02* (2013.01); *B32B 2250/24* (2013.01); *B32B 2264/10* (2013.01); *B32B 2264/102* (2013.01); *B32B 2333/08* (2013.01); *B32B 2333/12* (2013.01); *B32B 2367/00* (2013.01); *B32B 2457/202* (2013.01); *B32B 2457/206* (2013.01); *B32B 2457/208* (2013.01); *C08K 3/0033* (2013.01); *C08K 5/0025* (2013.01); *C08K 5/3415* (2013.01); *C08K 5/34922* (2013.01); *C08K 5/353* (2013.01); *C08K 2003/2237* (2013.01); *C08K 2003/2241* (2013.01); *C08K 2003/2244* (2013.01); *C09D 133/02* (2013.01); *C09D 133/04* (2013.01); *C09D 133/062* (2013.01); *C09D 133/08* (2013.01); *C09D 133/12* (2013.01); *C09D 161/28* (2013.01); *C09D 167/00* (2013.01); *C09D 167/02* (2013.01); *C09D 167/03* (2013.01); *Y10T 428/265* (2015.01); *Y10T 428/269* (2015.01); *Y10T 428/31797* (2015.04); *Y10T 428/31935* (2015.04)

(58) Field of Classification Search
None
See application file for complete search history.

(56) References Cited

U.S. PATENT DOCUMENTS 4,571,363 A * 2/1986 Culbertson ............... B44D 3/18
428/332
4,680,204 A * 7/1987 Das ........................ B05D 5/068
427/407.1

(Continued)

FOREIGN PATENT DOCUMENTS

WO   WO 2011-016356     *  2/2011
WO   WO 2012/056972 A   *  5/2012

*Primary Examiner* — Vivian Chen
(74) *Attorney, Agent, or Firm* — Birch, Stewart, Kolasch & Birch, LLP

(57) ABSTRACT

The present invention provides a laminated film comprising a polyester film having a resin layer on at least one side thereof, wherein said resin layer contains at least metal oxide particles (A) having a number average particle diameter of 3 nm or more and 50 nm or less, and an acrylic resin (B), and a component ($C_1$) derived from an oxazoline-based compound and/or a component ($C_2$) derived from a melamine-based compound, and wherein said acrylic resin (B) contains a monomer unit ($b_1$), a monomer unit ($b_2$) and a monomer unit ($b_3$). The present invention provides a laminated film which is excellent in transparency, suppression of interference pattern upon lamination of a high refractive index hard coat layer, adhesive property to a high refractive index hard coat layer, and adhesion under high temperature and high humidity conditions (adhesion under high temperature and high humidity conditions), at a low cost.

12 Claims, No Drawings

(51) Int. Cl.
*C08K 5/3415* (2006.01)
*C08K 5/3492* (2006.01)
*C08K 5/353* (2006.01)
*C09D 133/02* (2006.01)
*C09D 133/04* (2006.01)
*C09D 133/08* (2006.01)
*C09D 133/10* (2006.01)
*C09D 133/12* (2006.01)
*C09D 133/14* (2006.01)
*C09D 167/00* (2006.01)
*C09D 167/02* (2006.01)
*C09D 167/03* (2006.01)
*C08F 220/18* (2006.01)
*C09D 161/28* (2006.01)
*B32B 38/00* (2006.01)
*B29K 33/00* (2006.01)
*B29K 33/04* (2006.01)
*C09D 133/06* (2006.01)
*C08K 3/22* (2006.01)
*C08K 3/00* (2006.01)
*C08K 5/00* (2006.01)
*B29K 67/00* (2006.01)
*B29K 105/00* (2006.01)

(56) References Cited

U.S. PATENT DOCUMENTS

| | | | | |
|---|---|---|---|---|
| 5,021,278 A | * | 6/1991 | Short | B29C 51/14 428/195.1 |
| 5,026,448 A | * | 6/1991 | Reafler | B32B 27/08 156/212 |
| 5,100,735 A | * | 3/1992 | Chang | B05D 7/534 427/407.1 |
| 5,156,904 A | * | 10/1992 | Rice | B29C 55/026 264/175 |
| 5,840,372 A | * | 11/1998 | Rink | B05D 5/068 427/407.1 |
| 6,025,449 A | * | 2/2000 | Enomoto | C08F 220/18 524/558 |
| 6,403,224 B1 | * | 6/2002 | Okajima | C08J 7/04 428/423.7 |
| 6,794,442 B2 | * | 9/2004 | Colyer | C08G 18/4063 427/407.1 |
| 7,101,505 B2 | * | 9/2006 | Winget | B29C 43/203 264/250 |
| 2001/0033897 A1 | * | 10/2001 | Magoshi | B05D 7/53 427/385.5 |
| 2002/0098328 A1 | * | 7/2002 | Boris | B44C 1/10 428/201 |
| 2003/0060560 A1 | * | 3/2003 | Baugh | B05D 7/536 524/558 |
| 2003/0175435 A1 | * | 9/2003 | Harakawa | C08F 265/04 427/385.5 |
| 2003/0175502 A1 | * | 9/2003 | Obayashi | G02B 1/11 428/327 |
| 2005/0025978 A1 | * | 2/2005 | Okada | B05D 7/14 428/423.1 |
| 2006/0019114 A1 | * | 1/2006 | Thies | C03C 17/007 428/522 |
| 2006/0165919 A1 | * | 7/2006 | Suzuki | C08F 214/18 428/1.31 |
| 2006/0240232 A1 | * | 10/2006 | Faris | G02B 1/111 428/212 |
| 2007/0289497 A1 | * | 12/2007 | Suzuki | C09D 133/16 106/287.24 |
| 2008/0292802 A1 | * | 11/2008 | Tonomura | B05D 7/14 427/393.5 |
| 2009/0110936 A1 | * | 4/2009 | Noda | C08J 7/047 428/423.1 |
| 2011/0070416 A1 | * | 3/2011 | Nemoto | B32B 27/36 428/212 |
| 2013/0237660 A1 | * | 9/2013 | Iwasaki | C08F 220/12 524/531 |

* cited by examiner

LAMINATED FILM AND METHOD FOR PRODUCING SAME

TECHNICAL FIELD

The present invention relates to a laminated film comprising a polyester film having a resin layer on at least one side thereof. More specifically, the present invention relates to a laminated film excellent in transparency, suppression of interference pattern (visibility) upon lamination of a high refractive index hard coat layer, adhesion to a high refractive index hard coat layer, and adhesion under high temperature and high humidity conditions (adhesion under high temperature and high humidity conditions).

BACKGROUND ART

Thermoplastic resin films, particularly biaxially stretched polyester films, are widely used in a number of applications such as magnetic recording materials and wrapping materials because of their excellent mechanical properties, electrical properties, dimensional stability, transparency and chemical resistance.

Especially in recent years, polyester films are used in display-component applications such as touch panels, liquid display panels (LCD), plasma display panels (PDP) and organic electroluminescence (organic EL), as well as in various types of films for optical applications.

Particularly in such applications, a hard coat film composed of a polyester film on which a hard coat layer is laminated is used. Further, in order to improve the adhesive property between the polyester film as a substrate and the hard coat layer, a coating layer having an adhesive property is often disposed as an inner layer.

Hard coat films are required to have an adhesive property to a substrate at an ordinary temperature and also under high temperature and high humidity conditions, transparency, abrasion-resistance, and antifouling property. In addition, since hard coat films are often used on the surfaces of displays and the like, they are required to have visibility and design characteristics. In cases where a hard coat layer is laminated on a polyester film as a substrate, and when there is a difference in the refractive indices of the hard coat layer and the substrate polyester film, reduction of interference pattern is needed, because the occurrence of the interference pattern due to interface reflection leads to deterioration of visibility. As a result, after forming a refractive index controlling layer (AR layer, index-matching layer) or an antifouling layer on the hard coat layer, the visibility of the image display device and the like may be deteriorated, or the high-grade feeling may be compromised.

With growing demand for display devices having a larger size, higher definition and higher grade, especially in recent years, the required levels for suppression of interference pattern, particularly under a fluorescent lamp, transparency, and adhesive property between layers are increasing.

On the other hand, in cases where a refractive index controlling layer composed of a high refractive index layer/low refractive index layer is laminated on the surface of the hard coat layer, use of a hard coat layer having a higher refractive index enables to eliminate the necessity of having the high refractive index layer in the refractive index controlling layer. As a result, a large reduction in cost during the film production process can be achieved without compromising its functions. This technique is drawing attention, reflecting a strong demand for cost reduction in recent years.

PRIOR ART DOCUMENTS

Patent Documents

As the method for suppressing the interference pattern, in cases where such a hard coat layer having a high refractive index (for example, refractive index of 1.63) is disposed on a polyester film as a substrate (for example, refractive index of 1.66), (a) a method is disclosed in which the substrate film is subjected to a calendar treatment after formation of an adhesion layer to reduce variation in the localized thicknesses of the substrate film (Patent Document 1).

Further, (b) a method is disclosed in which a layer having a low refractive index is disposed on the surface layer of the substrate film, and an adhesion layer having an intermediary refractive index between those of the hard coat layer and the substrate film is also disposed, to utilize an interference offset effect (Patent Document 2).

In addition, (c) a method in which a high refractive index adhesion layer is disposed between the hard coat layer and the substrate film, wherein the adhesion layer has an intermediary refractive index (from 1.63 to 1.66) between those of the hard coat layer and the substrate film (Patent Documents 3 and 4); and a method in which metal oxide particles having a high refractive index and coarse particles having an average particle diameter of 200 nm or more are used in combination, to form a concave-convex structure at the interface of a coating layer and the hard coat layer (Patent Document 5) are disclosed.

Patent Document 1 JP 2001-71439 A
Patent Document 2 JP 4169548 B
Patent Document 3 JP 3632044 B
Patent Document 4 JP 2004-54161 A
Patent Document 5 JP 4547644 B

SUMMARY OF THE INVENTION

Problems to be Solved by the Invention

The method proposed in Patent Document 1 enabled to suppress the interference pattern relatively in cases where the refractive index of the hard coat layer is 1.60 or less. However, obvious interference pattern was observed when a hard coat layer having a refractive index of 1.60 or more and 1.65 or less was laminated, although having a good adhesive property.

Further, the method proposed in Patent Document 2 is not suitable for general-purpose, since its application is limited to the case where polyethylene naphthalene dicarboxylate (refractive index of 1.7 or more) is used as the substrate material.

In Patent Documents 3 and 4, a method in which a water soluble metal chelate compound or a metal acylate compound is added to a water soluble polyester resin (Patent Document 3), and a method in which a polymer binder and a metal oxide having a high refractive index is added to a water soluble polyester resin (Patent Document 4), are proposed. However, these methods require addition of a large amount of nano-order fine particles, and there has been a problem that the use of nano-order fine particles significantly increases the surface area of the fine particles, resulting in particle aggregation and thereby in a decrease in transparency. Further, there has been a problem that the aggregation of fine particles causes variation in the refractive indices within the surface of the resin layer, and also reduces the suppression of interference pattern. In addition, in the region of the resin layer where fine particles are aggregated, the ratio of the binder component contributing to the adhesion to the hard coat layer is relatively decreased, and the adhesive property is also decreased.

In Patent Document 5 in which metal oxide particles and coarse particles having an average particle diameter of 200 nm or more are used, the light scattering caused by the coarse particles having an average particle diameter of 200 nm or more is utilized to reduce the interference pattern. In this case, there has been a problem that the haze of the coating film is increased, because of utilizing the light scattering.

Accordingly, an object of the present invention is to solve the above described problems, and to provide a laminated polyester film excellent in transparency, visibility, and adhesive property to a substrate and a hard coat layer.

Means for Solving the Problems

To solve the above mentioned problems, the laminated film of the present invention has one of the following constitutions. That is, a laminated film comprising a polyester film having a resin layer on at least one side thereof,
wherein the resin layer contains at least
  metal oxide particles (A) having a number average particle diameter of 3 nm or more and 50 nm or less, and
  an acrylic resin (B), and
  an oxazoline-based compound ($C_1'$) and/or a melamine-based compound ($C_2'$), and
wherein the acrylic resin (B) contains a monomer unit ($b_1$) represented by Formula (1), a monomer unit ($b_2$) represented by Formula (2), and a monomer unit ($b_3$) represented by Formula (3):
or
a laminated film comprising a polyester film having a resin layer on at least one side thereof,
wherein the resin layer contains at least
  metal oxide particles (A) having a number average particle diameter of 3 nm or more and 50 nm or less, and
  an acrylic resin (B), and
  a component ($C_1$) derived from an oxazoline-based compound and/or a component ($C_2$) derived from a melamine-based compound, and
wherein the acrylic resin (B) contains a monomer unit ($b_1$) represented by Formula (1), a monomer unit ($b_2$) represented by Formula (2), and a monomer unit ($b_3$) represented by Formula (3):

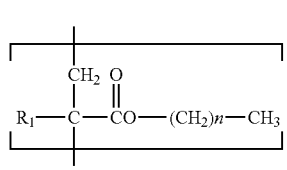

Formula (1)

(wherein in Formula (1), $R_1$ group represents a hydrogen atom or a methyl group; and n represents an integer of 9 or more and 34 or less)

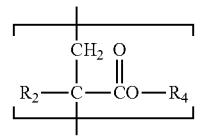

Formula (2)

(wherein in Formula (2), $R_2$ group represents a hydrogen atom or a methyl group; and $R_4$ group represents a group containing 2 or more saturated hydrocarbon ring)

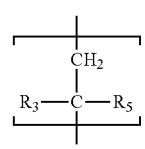

Formula (3)

(wherein in Formula (3), $R_3$ group represents a hydrogen atom or a methyl group; and $R_5$ group represents a hydroxyl group, a carboxyl group, a tertiary amino group, a quaternary ammonium salt group, a sulfonic acid group, or a phosphate group).

Further, the method for producing the laminated film of the present invention has the following constitution. That is, a method for producing a laminated film comprising forming a resin layer(s) on at least one side of a polyester film, wherein said method comprises: forming a resin on at least one side of the polyester film using the following resin composition; then stretching the laminated film at least uniaxially; and then subjecting the laminated film to heat treatment,
wherein the resin composition contains at least
  metal oxide particles (A) having a number average particle diameter of 3 nm or more and 50 nm or less, and
  an acrylic resin (B), and
  an oxazoline-based compound ($C_1'$) and/or a melamine-based compound ($C_2'$),
wherein the acrylic resin (B) contains a monomer unit ($b_1$) represented by Formula (1), a monomer unit ($b_2$) represented by Formula (2), and a monomer unit ($b_3$) represented by Formula (3):

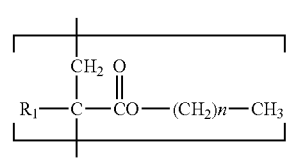

Formula (1)

(wherein in Formula (1), $R_1$ group represents a hydrogen atom or a methyl group; and n represents an integer of 9 or more and 34 or less)

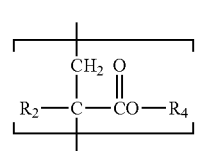

Formula (2)

(wherein in Formula (2), $R_2$ group represents a hydrogen atom or a methyl group; and $R_4$ group represents a group containing 2 or more saturated hydrocarbon ring)

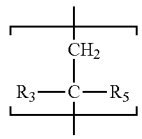

Formula (3)

(wherein in Formula (3), $R_3$ group represents a hydrogen atom or a methyl group; and $R_5$ group represents a hydroxyl group, a carboxyl group, a tertiary amino group, a quaternary ammonium salt group, a sulfonic acid group, or a phosphate group).

Effect of the Invention

The laminated film of the present invention is excellent in transparency, suppression of interference pattern upon lamination of a high refractive index hard coat layer, adhesive property to a high refractive index hard coat layer, and adhesion under high temperature and high humidity conditions (adhesion under high temperature and high humidity conditions).

MODE FOR CARRYING OUT THE INVENTION

The laminated film of the present invention will now be described in detail.

The laminated film of the present invention has the above described constitution, and the resin layer preferably contains particles (AB) which are the metal oxide particles (A) having the acrylic resin (B) on the surfaces thereof. Further, the metal oxide particles (A) are preferably titanium oxide particles ($A_1'$) and/or zirconium oxide particles ($A_2'$). In addition, the resin layer preferably contains a polyester resin (D) having a fluorene structure, and the polyester resin (D) preferably does not contain a dicarboxylic acid component ($Da_3$) containing a sulfonate group, or contains the same in an amount less than 0.1% by mole relative to the amount of dicarboxylic acid component (Da) constituting the polyester resin (D). The resin layer preferably has a thickness of from 10 to 50 nm.

In order to obtain the laminated film of the present invention, it is necessary that the resin layer contains at least metal oxide particles (A), and acrylic resin (B), and component ($C_1$) derived from an oxazoline-based compound and/or component ($C_2$) derived from a melamine-based compound.

By containing acrylic resin (B) which contains monomer unit ($b_1$) represented by Formula (1), monomer unit ($b_2$) represented by Formula (2), and monomer unit ($b_3$) represented by Formula (3); and component ($C_1$) derived from an oxazoline-based compound and/or component ($C_2$) derived from a melamine-based compound; aggregation of the metal oxide particles (A) during the process of forming the resin layer can be inhibited. As a result, an improvement in the transparency (reduction in the haze) of the laminated film, suppression of interference pattern upon lamination of a high refractive index hard coat layer, improvement in the adhesive property to a high refractive index hard coat layer, and improvement in the adhesion under high temperature and high humidity conditions (adhesion under high temperature and high humidity conditions) can be achieved.

Further, when the aggregation of the metal oxide particles (A) is inhibited, the interference pattern upon lamination of a high refractive index hard coat layer can be suppressed. Inhibition of the aggregation of the metal oxide particles (A) enables metal oxide particles (A) to exist in the resin layer uniformly, thereby allowing for formation of a resin layer having a uniform thickness, as well as a uniform increase in the reflection ratio of the resin layer. As a result, it is considered that the difference in the refractive indices of the substrate polyester film, the resin layer, and the high refractive index hard coat layer becomes almost the same, leading to the suppression of interference pattern.

Further, since inhibition of the aggregation of metal oxide particles (A) enables the metal oxide particles (A) having a low adhesion to a hard coat layer to exist uniformly in the resin layer, the adhesion to the hard coat layer can be improved.

[Acrylic Resin (B)]

It is important that acrylic resin (B) contained in the resin layer of the present invention contains monomer unit ($b_1$) represented by Formula (1), monomer unit ($b_2$) represented by Formula (2), and monomer unit ($b_3$) represented by Formula (3):

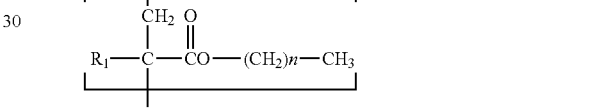

Formula (1)

(wherein in Formula (1), $R_1$ group represents a hydrogen atom or a methyl group; and n represents an integer of 9 or more and 34 or less)

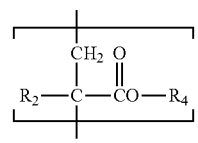

Formula (2)

(wherein in Formula (2), $R_2$ group represents a hydrogen atom or a methyl group; and $R_4$ group represents a group containing 2 or more saturated hydrocarbon ring)

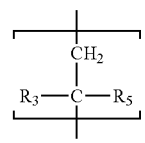

Formula (3)

(wherein in Formula (3), $R_3$ group represents a hydrogen atom or a methyl group; and $R_5$ group represents a hydroxyl group, a carboxyl group, a tertiary amino group, a quaternary ammonium salt group, a sulfonic acid group, or a phosphate group).

Here, it is important that acrylic resin (B) of the present invention contains monomer unit ($b_1$) represented by Formula (1).

In cases where an acrylic resin containing a monomer unit wherein n in Formula (1) is less than 9 is used, dispersibility of metal oxide particles (A) in an aqueous solvent (the aqueous solvent will be described in detail later) becomes unstable. As will be described later, in the present invention, the resin layer is preferably formed by coating a resin composition containing metal oxide particles, and an acrylic resin, and an oxazoline-based compound and/or a melamine-based compound, and an aqueous solvent, on a polyester film as a substrate, and then by drying. Therefore, in cases where an acrylic resin containing a monomer unit wherein n in Formula (1) is less than 9 is used, aggregation or precipitation of metal oxide particles (A) in the resin composition, or aggregation of metal oxide particles (A) during the drying process may occur. As a result, there are cases where a laminated film having a good transparency may not be obtained, or the interference pattern upon lamination of a high refractive index hard coat layer may not be good. On the other hand, use of an acrylic resin containing a monomer unit wherein n in Formula (1) is more than 34, whose solubility in an aqueous solvent is significantly low, makes the acrylic resin more likely to aggregate in the aqueous solvent. Since such aggregates are larger than the wavelength of visible light, there are cases where a laminated film having a good transparency may not be obtained, or the interference pattern upon lamination of a high refractive index hard coat layer may not be good. In addition, since aggregates interfere with the uniform formation of a resin layer, adhesion to the hard coat layer may be reduced.

In order for the acrylic resin (B) of the present invention to contain monomer unit ($b_1$) represented by Formula (1), it is important to carry out polymerization using (meth)acrylate monomer (b1') represented by Formula (4) below as a material.

The (meth)acrylate monomer ($b_1$') is preferably a (meth)acrylate monomer wherein n in Formula (4) is represented by an integer of 9 or more and 34 or less, more preferably, a (meth)acrylate monomer wherein n is 11 or more and 32 or less, still more preferably, a (meth)acrylate monomer wherein n is 13 or more and 30 or less.

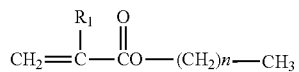

Formula (4)

(In Formula (4), $R_1$ group represents a hydrogen atom or a methyl group).

There is no specific limitation on (meth)acrylate monomer ($b_1$') as long as n in Formula (4) is 9 or more and 34 or less. Specific examples include, dodecyl(meth)acrylate, tridecyl (meth)acrylate, tetradecyl(meth)acrylate, 1-methyl tridecyl (meth)acrylate, hexadecyl(meth)acrylate, octadecyl(meth) acrylate, eicosyl(meth)acrylate, dococyl(meth)acrylate, tetracocyl(meth)acrylate, triacontyl(meth)acrylate and the like. Dodecyl(meth)acrylate and tri decyl(meth)acrylate are particularly preferred. These monomers may be used alone or as a mixture of two or more.

Further, it is important that the acrylic resin (B) of the present invention contains monomer unit ($b_2$) represented by the Formula (2).

In cases where an acrylic resin containing a monomer unit containing only one saturated hydrocarbon ring in Formula (2) is used, the function as a steric barrier becomes insufficient, leading to aggregation or precipitation of metal oxide particles (A) in the resin composition, or aggregation of metal oxide particles (A) during the drying process.

Since such aggregates are larger than the wavelength of visible light, a laminated film having a good transparency may not be obtained, or the interference pattern upon lamination of a high refractive index hard coat layer may be insufficient. In addition, since aggregates interfere with the uniform formation of a resin layer, adhesion to the hard coat layer may be reduced.

In order for the acrylic resin (B) of the present invention to contain monomer unit ($b_2$) represented by Formula (2), it is important to use (meth)acrylate monomer ($b_2$') represented by Formula (5) below as a material.

Examples of (meth)acrylate monomer ($b_2$') represented by Formula (5) include compounds having various types of cyclic structures, such as a cross-linked condensed cyclic structure (having a structure in which 2 or more rings, each sharing 2 atoms, are bound) and spiro-cyclic structure (having a structure in which 2 cyclic structures are bound, sharing one carbon atom), specifically, a bicyclo group, a tricyclo group, or a tetracyclo group. Among these, (meth) acrylate containing a bicyclo group is preferred, particularly in terms of compatibility with binders.

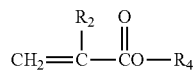

Formula (5)

(In Formula (5), $R_2$ group represents a hydrogen atom or a methyl group; and $R_4$ group represents a group containing 2 or more saturated hydrocarbon ring.)

Examples of the (meth)acrylate containing a bicyclo group include isobonyl(meth)acrylate, bornyl(meth)acrylate, dicyclopentanyl(meth)acrylate, dicyclopentenyl(meth)acrylate, adamantyl(meth)acrylate, and dimethyl adamantyl (meth)acrylate. Isobonyl(meth)acrylate is particularly preferred.

Further, it is important that acrylic resin (B) of the present invention contains monomer unit ($b_3$) represented by the above Formula (3).

In cases where an acrylic resin containing a monomer unit in which $R_5$ group in Formula (3) does not have any of the hydroxyl group, carboxyl group, tertiary amino group, quaternary ammonium salt group, sulfonic acid group, and phosphate group is used, the compatibility of the acrylic resin in an aqueous solvent becomes insufficient, which may lead to the deposition of the acrylic resin and thereby to the aggregation or precipitation of metal oxide particles (A) in the resin composition, or to the aggregation of metal oxide particles (A) during the drying process.

Since such aggregates are larger than the wavelength of visible light, a laminated film having a good transparency may not be obtained, or the interference pattern upon lamination of a high refractive index hard coat layer may be insufficient. In addition, since aggregates interfere with the uniform formation of a resin layer, adhesion to the hard coat layer may be reduced.

In order for the acrylic resin (B) of the present invention to contain monomer unit ($b_3$) represented by Formula (3), it is necessary to carry out copolymerization using (meth) acrylate monomer ($b_3$') represented by Formula (6) below as a material.

Examples of the (meth)acrylate monomer (b₃') represented by Formula (6) include the following compound:

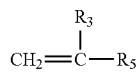

Formula (6)

(wherein in Formula (6), $R_3$ group represents a hydrogen atom or a methyl group; and $R_5$ group represents a hydroxyl group, a carboxyl group, a tertiary amino group, a quaternary ammonium salt group, a sulfonic acid group, or a phosphate group).

Examples of the (meth)acrylate monomers having a hydroxyl group(s) include 2-hydroxyethyl (meth)acrylate, 2-hydroxypropyl (meth)acrylate, 2,3-dihydroxybutyl (meth) acrylate, 4-hydroxybutyl (meth)acrylate, and monoesterified products of polyols such as polyethylene glycol mono(meth) acrylate and (meth)acrylic acid; and compounds formed by ring-opening polymerization of the monoesterified products with ε-caprolactone. Particularly preferred are 2-hydroxy ethyl (meth)acrylate and 2-hydroxypropyl (meth)acrylate.

Examples of the (meth)acrylate monomers having a carboxyl group(s) include α, β-unsaturated carboxylic acids such as acrylic acid, methacrylic acid, itaconic acid, fumaric acid and maleic acid; and half-esterified products of hydroxyalkyl(meth)acrylate and acid anhydrides. Acrylic acid and methacrylic acid are particularly preferred.

Examples of the tertiary amino group-containing monomers include N,N-dialkylaminoalkyl(meth)acrylates such as N,N-dimethylaminoethyl(meth)acrylate, N,N-diethyl amino ethyl(meth)acrylate, and N,N-dimethylaminopropyl(meth) acrylate; N,N-dialkylaminoalkyl(meth)acrylamides such as N,N-dimethylaminoethyl(meth)acrylamide, N,N-diethyl amino ethyl(meth)acrylamide, and N,N-dimethylaminopropyl(meth)acrylamide; and the like. N,N-dimethylaminoethyl (meth)acrylate is particularly preferred.

As the quaternary ammonium salt group-containing monomer, those obtained by reacting the above described tertiary amino group-containing monomers with a quaternization agent such as epihalohydrin, benzyl halide, or alkyl halide are preferred. Specific examples include (meth)acryloyloxyalkyl trialkylammonium salts such as 2-(methacryloyloxy)ethyltrimethylammonium chloride, 2-(methacryloyloxy)ethyltrimethylammonium bromide, and 2-(methacryloyloxy)ethyltrimethylammonium dimethylphosphate; (meth)acryloylaminoalkyl trialkylammonium salts such as methacryloylaminopropyl trimethylammonium chloride, and methacryloylaminopropyl trimethylammonium bromide; tetraalkyl(meth)acrylates such as tetrabutylammonium(meth)acrylate; and trialkylbenzylammonium (meth9acrylates such as trimethylbenzylammonium(meth) acrylate and the like. Particularly preferred is 2-(methacryloyloxy)ethyltrimethylammonium chloride.

Examples of the sulfonic acid group-containing monomers include (meth)acrylamide-alkane sulfonic acids such as butyl acrylamide sulfonic acid, and 2-acrylamide-2-methylpropan sulfonic acid; and sulfoalkyl (meth)acrylates such as 2-sulfoethyl (meth)acrylate. Particularly preferred is 2-sulfoethyl (meth)acrylate.

Examples of the phosphate group-containing acrylic monomers include acid phosphooxyethyl(meth)acrylate and the like. Acid phosphooxyethyl(meth)acrylate is particularly preferred.

For the production of the laminated film of the present invention, a suitable method is one in which a resin composition containing an aqueous solvent is coated on a polyester film whose crystal orientation is not yet completed, followed by stretching and heat treatment to complete the crystal orientation. This method is suitably used because, a heat treatment at a high temperature can be performed, the adhesion between the substrate and the resin layer can be improved, and a more uniform and thinner resin layer can be formed. In cases where this method is used to form a resin layer, acrylic resin (B) is preferably an aqueous resin which can be dissolved, emulsified, or suspended in an aqueous solvent, in terms of environmental contamination or explosion-proof properties. Such an acrylic resin which can be dissolved, emulsified, or suspended in water can be produced by methods such as copolymerization, emulsification polymerization using a reactive emulsifier or a surfactant, suspension polymerization, or soap-free polymerization with a monomer having a hydrophilic group (such as acrylic acid, methacrylic acid, acrylamide, vinyl sulfonic acid and salts thereof).

As the polymerization initiator, common radical polymerization initiators can be used, but not specifically limited thereto. Examples thereof include water soluble peroxides such as potassium persulfate, ammonium persulfate, and hydrogen peroxide; oil soluble peroxides such as benzoyl peroxide and t-butyl hydroperoxide; and azo compounds such as azodiisobutyronitrile.

It is important that the resin layer of the laminated film of the present invention contains at least metal oxide particles (A) in addition to the acrylic resin (B), and component ($C_1$) derived from an oxazoline-based compound and/or component ($C_2$) derived from a melamine-based compound, and that the metal oxide particles (A) have a number average particle diameter of 3 nm or more and 50 nm or less.

[Metal Oxide Particles (A)]

By using the metal oxide particles (A) described above, the refractive index of the resin layer can be increased. As a result, the interference pattern upon lamination of a hard coat layer can be suppressed, and in addition, the transparency of the laminated film can be increased because the number average particle diameter of the metal oxide particles (A) is sufficiently smaller than the wavelength of visible light.

In the present invention, metal oxide particles (A) refer to oxide fine particles of elements having high malleability and ductility, and having high electrical and thermal conductivity, with a metallic luster; that is, elements which are located on the left side of the diagonal line connecting boron (B), silicon (Si), arsenic (As), tellurium (Te) and astatine (At) in the periodic table. Further, the metal oxide particles (A) are more preferably oxide fine particles of elements located on the right side of the alkali earth metals (group 2) in the above mentioned periodic table.

In terms of suppression of interference pattern, suitable as such metal oxide fine particles are metal oxide particles having a high refractive index, preferably, metal oxide particles having a refractive index of 1.6 or more. Examples of the metal oxide particles having a high refractive index include $TiO_2$, $ZrO_2$, $ZnO$, $CeO_2$, $SnO_2$, $Sb_2O_5$, indium-doped tin oxide (ITO), phosphorus-doped tin oxide (PTO), $Y_2O_5$, $La_2O_3$, and $Al_2O_3$.

These metal oxide particles may be used alone as a single type, or in combination of 2 or more types. In terms of dispersion stability and refractive index, titanium oxide particles ($TiO_2$) ($A_1$') and/or zirconium oxide particles ($ZrO_2$) ($A_2$') are particularly preferred.

The number average particle diameter of the metal oxide particles (A) will now be described. The number average particle diameter herein refers to the particle diameter obtained by transmission electron microscope (TEM). The number average particle diameter was obtained by measuring the outer diameters of 10 particles present in the image plane at a magnification of 500,000, and by averaging the measurements in 10 visual fields for a total of one hundred particles. The outer diameter herein refers to the maximum diameter of a particle (that is, the longer diameter, which is the longest diameter of the particle). In cases where a particle contains a cavity inside, it also refers to the maximum diameter of the particle.

Use of the metal oxide particles (A) having a number average particle diameter of less than 3 nm may not be preferred, because it significantly increases the Van der Waals' forces between metal oxide particles, making particles more prone to aggregation, which then causes the scattering of light, resulting in a reduction in the transparency. On the other hand, use of the metal oxide particles (A) having a number average particle diameter of greater than 50 nm is not preferred, in terms of transparency, because it causes the scattering of light, resulting in an increase in the haze and decrease in the reflection ratio. The metal oxide particles (A) have the number average particle diameter of 3 nm or more and 50 nm or less, preferably 10 nm or more and 45 nm or less, more preferably 15 nm or more and 40 nm or less.

Further, metal oxide particles (A) are more preferably particles (AB) having acrylic resin (B) on one part or all of the surfaces thereof (it should be noted that the resin layer containing particles (AB) naturally contains metal oxide particles (A) and acrylic resin (B)). It is because, if the resin layer contains the particles (AB), the aggregation of metal oxide particles (A) or particles (AB) during the drying process can be inhibited and the transparency can also be increased, when forming the resin layer using the resin composition described later.

In the present invention, the expression that metal oxide particles (A) have acrylic resin (B) on the surfaces thereof means that acrylic resin (B) is adsorbed on/adhered to one part or all of the surfaces of metal oxide particles (A).

The examples of the method for producing particles (AB) include a method in which metal oxide particles (A) are subjected to a surface treatment with acrylic resin (B), but not specifically limited thereto. Specific examples include the following methods (i) to (iv). In the present invention, the surface treatment refers to the treatment in which acrylic resin (B) is adsorbed on/adhered to all or one part of the surfaces of metal oxide particles (A).

(i) A method in which a mixture of metal oxide particles (A) and acrylic resin (B) mixed in advance is added to a solvent, followed by dispersion.

(ii) A method in which metal oxide particles (A) and acrylic resin (B) are added to a solvent in this order, followed by dispersion.

(iii) A method in which metal oxide particles (A) and acrylic resin (B) are dispersed in a solvent, respectively, in advance, followed by mixing the resulting dispersions.

(iv) A method in which metal oxide particles (A) are dispersed in a solvent, followed by addition of acrylic resin (B) to the resulting dispersion.

The desired effect can be obtained by any of these methods.

Examples of the apparatus for performing dispersion, which can be used, include a dissolver, high speed mixer, a homomixer, a kneader, a ball mill, a roll mill, a sand mill, a paint shaker, a SC mill, an annular mill, and a pin mill.

Dispersion is carried out using the above mentioned apparatus, rotating the rotation axis at a peripheral speed of from 5 to 15 m/s. The rotation time is from 5 to 10 hours.

In addition, use of dispersion beads such as glass beads when performing dispersion is preferred in terms of increasing the dispersibility. The bead diameter is preferably from 0.05 to 0.5 mm, more preferably from 0.08 to 0.5 mm, and particularly preferably from 0.08 to 0.2 mm.

Mixing and stirring can be carried out by shaking the container with hand, using a magnetic stirrer or an impeller, or by performing ultrasonic irradiation or vibrational dispersion.

The presence or absence of acrylic resin (B) adsorbed on/adhered to all or one part of the surfaces of metal oxide particles (A) can be confirmed by the following analytic method. The object to be measured (such as a resin composition containing metal oxide particles (A)) is subjected to centrifuge separation using Hitachi Tabletop-Ultracentrifuge (CS150NX: manufactured by Hitachi Koki Co., Ltd.) (rotational speed: 3,0000 rpm, separation time: 30 minutes). After precipitating metal oxide particles (A) (and acrylic resin (B) adsorbed on the surfaces of metal oxide particles (A)), supernatant is removed and the precipitate is concentrated to dryness. The precipitate which is concentrated to dryness is analyzed using X-RAY PHOTOELECTRON SPECTROSCOPY (XPS) and the presence or absence of acrylic resin (B) on the surfaces of metal oxide particles (A) is confirmed. In cases where the presence of 1% by mass or more of acrylic resin (B) on the surfaces of metal oxide particles (A), relative to 100% by mass of the total amount of metal oxide particles (A) is confirmed, acrylic resin (B) is considered to be adsorbed on/adhered to the surfaces of metal oxide particles (A).

Further, the presence or absence of particles (AB) in the resin layer of the laminated film can be confirmed by using XPS, while etching with argon ions at an etching rate of 1 nm/min (in terms of $SiO_2$) from the resin layer-side of the laminated film. That is, when the presence of acrylic resin (B) on the surfaces of metal oxide particles (A) is confirmed, it confirms that the metal oxide particles (A) are particles (AB).

The content of metal oxide particles (A) in the resin layer is preferably 20% by mass or more and 70% by mass or less, relative to the total mass of the resin layer. The content is more preferably 25% by mass or more and 65% by mass or less, still more preferably, 30% by mass or more and 60% by mass or less. If the content of metal oxide particles (A) is 20% by mass or more and 70% by mass or less relative to the total mass of the resin layer, the refractive index of the resin layer can be improved without compromising the film-forming property of the resin layer. As a result, the desired transparency and sufficient suppression of interference pattern upon lamination of a hard coat layer can be provided.

Further, the content of acrylic resin (B) containing monomer unit ($b_1$) represented by Formula (1), monomer unit ($b_2$) represented by Formula (2), and monomer unit ($b_3$) represented by Formula (3) is preferably 5% by mass or more and 20% by mass or less, relative to the total mass of the resin layer. The content is more preferably 7% by mass or more and 18% by mass or less, still more preferably 9% by mass or more and 16% by mass or less. The content within the above mentioned range is preferred, because the aggregation between metal oxide particles (A) can be inhibited. As a result, the refractive index and the transparency of the resin layer can be improved, and in addition, sufficient suppression of interference pattern upon lamination of a hard coat layer can be provided.

[Polyester Resin (D) having a Fluorene Structure]

In the present invention, it is preferred that the resin layer contains metal oxide particles (A), and acrylic resin (B), and component ($C_1$) derived from an oxazoline-based compound and/or component ($C_2$) derived from a melamine-based compound, and further contains polyester resin (D) having a fluorene structure. More preferably, polyester resin (D) having a fluorene structure does not contain dicarboxylic acid component ($Da_3$) containing a sulfonate group, or contains the same in an amount less than 0.1% by mole relative to the amount of dicarboxylic acid component (Da) constituting the polyester resin (D).

Use of the polyester resin (D) having a fluorene structure increases the refractive index of the resin layer and improves the adhesion to a hard coat layer. As a result, suppression of interference pattern upon lamination of a high refractive index hard coat layer, adhesive property to a high refractive index hard coat layer, and adhesion under high temperature and high humidity conditions (adhesion under high temperature and high humidity conditions) can further be improved, and therefore it is more preferred.

Polyester resin (D) having a fluorene structure as used in the present invention refers to a polyester resin having an ester bond(s) in the main chain or the side chains, which resin can be obtained by the following method I) or II). In addition, a method in which I) and II) are used in combination (a method in which polycondensation reaction is carried out using dicarboxylic acid component (Da), glycol component (Db), and component (Dc) as components) may also be used.

I) A method in which polycondensation reaction is carried out using as the constituting components a dicarboxylic acid component (Da) and a glycol component (Db).

II) A method in which polycondensation reaction is carried out using as the constituting component a component (Dc) having one or more alcoholic groups (hydroxyl groups) and one or more carboxyl group(s).

In the above mentioned method I), dicarboxylic acid component (Da) is classified into dicarboxylic acid component ($Da_1$) having a fluorene structure and dicarboxylic acid component ($Da_2$) having no fluorene structure. Further, glycol component (Db) is classified into glycol component ($Db_1$) having a fluorene structure and glycol component ($Db_2$) having no fluorene structure. In the present invention, dicarboxylic acid component ($Da_1$) having a fluorene structure and/or glycol component ($Db_1$) having a fluorene structure is preferably copolymerized in order to introduce a fluorene structure into the polyester resin.

In addition, in the above mentioned method II), component (Dc) is classified into component ($Dc_1$) having a fluorene structure and component ($Dc_2$) having no fluorene structure. In the present invention, it is preferred that component ($Dc_1$) having a fluorene structure is copolymerized in order to introduce a fluorene structure into the polyester resin (D).

The details regarding the use of method I) to produce polyester resin (D) having a fluorene structure (hereinafter also referred to as, "polyester resin (D) copolymerized with fluorene") will be described below. The same applies for the method II).

Firstly, dicarboxylic acid component (Da) in the present invention includes ester-forming derivatives obtained by alkyl esterification of dicarboxylic acids. Further, dicarboxylic acid component (Da) includes not only dicarboxylic acids in the strict sense, but also higher-valent carboxylic acids of trivalent or more. Dicarboxylic acid component (Da) also includes acid anhydrides.

In the present invention, glycol component (Da) includes not only glycols in the strict sense, but also polyols of trivalent or more.

Examples of dicarboxylic acid component ($Da_1$) having a fluorene structure include 9,9-bis(t-butoxycarbonylmethyl) fluorene, 9,9-bis[2-(t-butoxycarbonyl)ethyl]fluorene, 9,9-bis[1-(t-butoxycarbonyl)ethyl]fluorene, 9,9-bis[2-(t-butoxycarbonyl)-1-methylpropyl]fluorene, 9,9-bis[2-(t-butoxycarbonyl)butyl]fluorene, 9,9-bis[5-(t-butoxycarbonyl)pentyl]fluorene and the like, but not limited thereto.

As the dicarboxylic acid component ($Da_2$) having no fluorene structure, aromatic, aliphatic or alicyclic dicarboxylic acids or higher-valent carboxylic acids of trivalent or more, having no fluorene structure, can be used. Examples of the dicarboxylic acid component ($Da_2$) which can be used in the present invention include terephthalic acid, isophthalic acid, phthalic acid, 2,5-dimethyl terephthalic acid, 1,4-naphthalene dicarboxylic acid, 2,6-naphthalene dicarboxylic acid, 1,2-bisphenoxyethane-p,p'-dicarboxylic acid, and the like. In addition, examples of the aliphatic and alicyclic dicarboxylic acids which can be used include succinic acid, adipic acid, sebacic acid, dodecanedioic acid, dimer acid, 1,3-cyclopentane dicarboxylic acid, 1,2-cyclohexane dicarboxylic acid, 1,4-cyclohexane dicarboxylic acid and the like; and ester-forming derivatives thereof.

Examples of glycol component ($Db_1$) having a fluorene structure include 9,9-bis[4-(2-hydroxyethoxy)phenyl]fluorene, 9,9-bis[4-(2-hydroxyethoxy)-3-methylphenyl]fluorene, 9,9-bis[4-(2-hydroxyethoxy)-3,5-diisopropylphenyl]fluorene, 9,9-bis[4-(2-hydroxyethoxy)-3,5-dibenzylphenyl]fluorene, 9,9-bis[4-(3-hydroxypropoxy)phenyl]fluorene, 9,9-bis[4-(4-hydroxybutoxy)phenyl]fluorene and the like, but not limited thereto.

Examples of glycol component ($Db_2$) having no fluorene structure which can be used include ethylene glycol, diethylene glycol, polyethylene glycol, propylene glycol, polypropylene glycol, 1,3-propanediol, 1,3-butanediol, 1,4-butanediol, 1,5-pentanediol, 1,7-heptanediol, 1,10-decanediol, neopentyl glycol, 4,4'-dihydroxybiphenol, o-, m-, and p-dihydroxybenzene, 4,4'-isopropylidene phenol, cyclopentane-1,2-diol, cyclohexane-1,2-diol, cyclohexane-1,4-diol and the like, but not limited thereto.

The copolymerization amount of dicarboxylic acid component ($Da_1$) having a fluorene structure in polyester resin (D) copolymerized with fluorene is preferably 40% by mole or more, more preferably 80% by mole or more, relative to the amount of dicarboxylic acid component (Da) constituting the polyester resin (D) copolymerized with fluorene. The upper limit of the copolymerization amount is preferably 95% by mole or less, but not specifically limited thereto.

Further, the copolymerization amount of glycol component ($Db_1$) having a fluorene structure in polyester resin (D) copolymerized with fluorene is preferably 40% by mole or more, more preferably 80% by mole or more, relative to the amount of glycol component (Db) constituting the polyester resin (D) copolymerized with fluorene. The upper limit of the copolymerization amount is not specifically limited, but 95% by mole or less is particularly preferred.

In cases where the copolymerization amount of dicarboxylic acid component ($Da_1$) having a fluorene structure or glycol component ($Db_1$) having a fluorene structure is less than 40% by mole, the refractive index of polyester resin (D) copolymerized with fluorene may not be sufficiently high.

Although the upper limit is not specifically limited, the copolymerization ratio of greater than 95% by mole leads to an increase in the glass transition temperature of polyester resin (D) copolymerized with fluorene, which then results in a poor followability upon stretching when forming the resin layer using the in-line coating method as described later, and a uniform resin layer may not be formed.

Further, the copolymerization amount of dicarboxylic acid component ($Da_1$) having a fluorene structure and glycol component ($Db_1$) having a fluorene structure in polyester resin (D) copolymerized with fluorene is preferably 20% by mole or more, more preferably, 40% by mole or more, relative to the total, taken as 100 mol %, of the amount of substance of dicarboxylic acid component (Da) and the amount of substance of glycol component (Db) constituting the polyester resin (D) copolymerized with fluorene. The upper limit of the copolymerization amount is preferably 50% by mole or less, but not specifically limited thereto.

In the present invention, polyester resin (D) copolymerized with fluorene is preferably water soluble. In order to make polyester resin (D) copolymerized with fluorene water soluble, it is preferable to introduce a hydrophilic component(s) such as a compound containing a carboxylate group or a compound containing a sulfonate group into the side chain(s) and the like of polyester resin (D). The introduction of the hydrophilic component(s) can be achieved by using dicarboxylic acid component ($Da_3$) containing a sulfonate group or higher-valent carboxylic acid component ($Da_4$) of trivalent or more as dicarboxylic acid component (Da).

Examples of dicarboxylic acid component ($Da_3$) containing a sulfonate group include alkali metal salts and alkali earth metal salts and the like of sulfoisophthalic acid, 5-sulfoisophthalic acid, 4-sulfophthalic acid, and 4-sulfonaphthalene-2,7-dicarvone-5[4-sulfophenoxy]isophthalic acid.

As higher-valent carboxylic acid component ($Da_4$) of trivalent or more, higher-valent carboxylic acids such as trimellitic acid, as well as acid anhydrides can also be used. Specific examples thereof include trimellitic anhydride, 1,2,4,5-butanetetracarboxylic acid dianhydride (pyromellitic anhydride), 1,2,3,4-pentanetetracarboxylic acid dianhydride, 3,3',4,4'-benzophenonetetracarboxylic acid dianhydride, 5-(2,5-dioxotetrahydrofurfuryl)-3-methyl-3-clyclohexene-1,2-dicarboxylic acid anhydride, cyclopentanetetracarboxylic acid dianhydride, 2,3,6,7-naphthalenetetracarboxylic acid dianhydride, 1,2,5,6-naphthalenetetracarboxylic acid dianhydride, ethylene glycol bistrimellitate dianhydride, 2,2',3,3'-diphenyltetracarboxylic acid dianhydride, thiophene-2,3,4,5-tetracarboxylic acid dianhydride, ethylene tetracarboxylic acid dianhydride and the like.

However, in applications where a good adhesion under high temperature and high humidity conditions is required, which are represented by recent display applications, use of a sulfonate group as the hydrophilic component of polyester resin (D) may result in a reduction of adhesion to an object to be adhered, such as a hard coat layer, under high temperature and high humidity conditions, depending on the hydrophilic strength of the sulfonate group.

Therefore, it is preferable in the present invention that polyester resin (D) copolymerized with fluorene does not contain dicarboxylic acid component ($Da_3$) containing a sulfonate group, or contains the same in an amount less than 0.1% by mole relative to the amount of dicarboxylic acid component (Da) constituting the polyester resin (D) copolymerized with fluorene. The amount of dicarboxylic acid component ($Da_3$) containing a sulfonate group is more preferably 0.05% by mole or less, particularly preferably, none (that is, 0% by mole).

Therefore, in the case of imparting hydrophilicity (water solubility) to polyester resin (D) copolymerized with fluorene in the present invention, it is preferable that higher-valent carboxylic acid component ($Da_4$) of trivalent or more is copolymerized. By copolymerizing higher-valent carboxylic acid component ($Da_4$) of trivalent or more, a carboxyl group(s) can be introduced into the side chain(s) of polyester resin (D). Further, the carboxyl group(s) may be converted to carboxylate group(s) by neutralization with ammonia, sodium hydroxide and the like. The hydrophilicity may further be increased by converting the carboxyl group(s) to carboxylate group(s).

In the present invention, it is preferable to use a tetracarboxylic acid as higher-valent carboxylic acid component ($Da_4$) of trivalent or more. Since tetracarboxylic acids contain more carboxyl groups compared to trivalent carboxylic acids such as trimellitic acid, the ratio of higher-valent carboxylic acid component ($Da_4$) in dicarboxylic acid component (Da) in polyester resin (D) copolymerized with fluorene required to impart hydrophilicity to polyester resin (D) copolymerized with fluorene, can be reduced. As a result, the number average molecular weight of the polyester resin can be sufficiently increased when forming the polyester resin by polymerization, and the adhesive property to a high refractive index hard coat layer to be laminated can be improved.

When the higher-valent carboxylic acid component is copolymerized, it is preferable to use a method in which polyester polyol (polyester oligomer) obtained by reacting dicarboxylic acid component (Da) and glycol component (Db) is reacted with higher-valent carboxylic acid anhydride ($Da_4$) of trivalent or more, to introduce a carboxyl group(s) into the side chain(s) of polyester resin (D). Use of such a method enables more efficient introduction of a carboxyl group(s) into the side chain(s) of polyester resin (D).

The amount of substance ($Da_4m$ (mole)) of higher-valent carboxylic acid anhydride ($Da_4$) used in the above method is preferably from 0.5 to 1.0 times the difference (Dam-Dbm (mole)) between the amount of substance (Dam (mole)) of glycol component (Da) and the amount of substance (Dbm (mole)) of the dicarboxylic acid component, used in the esterification reaction. If the amount of substance is within the preferred range described above, the prepared resin layer will have an excellent adhesion to a substrate under high temperature and high humidity conditions, and at the same time, the number average molecular weight of the polyester will be sufficiently increased.

An example of methods for producing polyester resin (D) copolymerized with fluorene will now be described. Firstly, esterification reaction is carried out using: succinic acid or an ester-forming derivative thereof as dicarboxylic acid component ($Da_2$) having no fluorene structure; 9,9-bis[4-(2-hydroxyethoxy)phenyl]fluorene as glycol component ($Da_1$) having a fluorene structure; a glycol component such as ethylene glycol as glycol component ($Db_2$) having no fluorene structure; and a catalyst; to obtain a polyester polyol. In the reaction, the added amount of 9,9-bis[4-(2-hydroxyethoxy)phenyl]fluorene and ethylene glycol is preferably from 1.01 to 2.0 times by mole relative to the total amount of the dicarboxylic acid component. If the added amount is within the preferred range described above, polyester polyol can be smoothly formed by polymerization under the presence of excessive amount of glycol component, and at the same time, the number average molecular weight distribution of the polyester resin is sufficiently increased.

Examples of the catalysts include titanium-based catalysts such as tetra isopropyl titanate and tetra-n-butyl titanate; antimony-based catalysts such as antimony trioxide; germanium-based catalysts such as germanium oxide; and catalysts such as zinc acetate, manganese acetate, and dibutyltin oxide. Tetra-n-butyl titanate is preferably used. The temperature and the time of the esterification reaction are not specifically limited, and those within known ranges can be used.

Higher-valent carboxylic acid anhydride ($Da_4$) is then added to the resulting polyester polyol. A desired polyester polyol can be obtained by performing the reaction at 160 to 200° C. for 1 to 10 hours. Approximately the same amount of the above mentioned catalyst may be added in the reaction.

In the present invention, the intrinsic viscosity of polyester resin (D) copolymerized with fluorene is preferably 0.3 dl/g or more in order to obtain a good adhesion to an object to be adhered such as a hard coat layer, but not specifically limited thereto. The upper limit of the intrinsic viscosity is preferably 0.8 dl/g or less in terms of handleability, but not specifically limited thereto. Polyester resin (D) copolymerized with fluorene having a desired intrinsic viscosity can be obtained by controlling the melt polymerization conditions such as polymerization time and polymerization temperature.

The glass transition point (hereinafter, may be abbreviated as "Tg") of polyester resin (D) copolymerized with fluorene is preferably from 50 to 170° C., more preferably from 50 to 150° C. The glass transition point within the preferred range described above provides an excellent adhesion under high temperature and high humidity conditions, and at the same time, enables the uniform coating of the resin layer using the in-line coating method described later. In order to achieve a Tg within the above range, a method can be used in which an aliphatic dicarboxylic acid component is used as dicarboxylic acid component ($Da_2$) other than the dicarboxylic acid component having a fluorene structure, in polyester resin (D) copolymerized with fluorene.

Further, the acid value of polyester resin (D) copolymerized with fluorene is preferably 20 mg KOH/g or more, more preferably 30 mg KOH/g or more. If the acid value is within the above range, a good adhesion to a hard coat layer, particularly a good adhesion under high temperature and high humidity conditions can be provided. The acid value within the above range can be obtained by adjusting the amount of higher-valent carboxylic acid anhydride ($Da_4$) reacted with the polyester polyol, when forming polyester resin (D) copolymerized with fluorene by polymerization.

In the present invention, the content of polyester resin (D) copolymerized with fluorene in the resin layer is preferably 5% by weight or more and 30% by mass or less, relative to the total amount of the resin layer.

The content of polyester resin (D) copolymerized with fluorene within the above range enables to achieve a higher refractive index of the resin layer; a smaller difference in the refractive indices between the substrate, the resin layer and the high refractive index hard coat layer; and a reduced interference pattern. In addition, adhesion to the high refractive index hard coat layer can be improved.

[Component ($C_1$) Derived from an Oxazoline-Based Compound and/or Component ($C_2$) Derived from a Melamine-Based Compound]

It is important that the resin layer of the laminated film of the present invention contains at least the aforementioned metal oxide particles (A) and acrylic resin (B), and further contains component ($C_1$) derived from an oxazoline-based compound and/or component ($C_2$) derived from a melamine-based compound.

By forming a resin layer using oxazoline-based compound ($C_1'$) and/or melamine-based compound ($C_2'$) in addition to acrylic resin (B), the aggregation of the metal oxide particles (A) during the process of forming the resin layer can be inhibited. As a result, the transparency and reflection ratio of the laminated film can be increased, and a laminated film having an excellent transparency, adhesion and visibility upon lamination of a hard coat layer can be obtained.

Further, if the aggregation of metal oxide particles (A) can be inhibited, the interference pattern upon lamination of a high refractive index hard coat layer can be suppressed. This is probably because, when the aggregation of metal oxide particles (A) is inhibited, uniform presence of metal oxide particles (A) in the resin layer becomes possible, and as a result, a resin layer having a uniform thickness can be obtained while increasing the reflection ratio of the resin layer uniformly, contributing to the suppression of the interference pattern.

Further, inhibition of the aggregation of metal oxide particles (A) prevents the localized presence of metal oxide particles (A) having a low adhesion to a hard coat layer, and adhesion to the hard coat layer can be improved.

As aforementioned, the resin composition in the present invention is preferably such that metal oxide particles (A) having the aforementioned acrylic resin (B) adsorbed on/adhered to one part or all of the surfaces thereof are present in an aqueous solvent. The resin composition containing the aqueous solvent is coated on a polyester film as a substrate, and the resultant is dried to form a resin layer. It is considered that, in cases where the particle content in the resin layer is 70% by mass or less, the aggregation between particles can be relatively inhibited, because acrylic resin (B) adsorbed on/adhered to the surfaces of metal oxide particles (A) serves as a steric barrier. However, a particle content of greater than 70% by mass complicates the inhibition of aggregation between particles.

However, if the resin composition contains component(s) derived from oxazoline-based compound ($C_1'$) and/or melamine-based compound ($C_2'$), inhibition of aggregation between particles becomes possible even in the case where the particle content is greater than 30 parts by mass.

Details regarding how the use of oxazoline-based compound ($C_1'$) and/or melamine-based compound ($C_2'$) enables the inhibition of aggregation remain unknown, but it is presently suspected as follows.

In an aqueous solvent, acrylic resin (B) exists adsorbed on/adhered to the surfaces of metal oxide particles (A), and oxazoline-based compound ($C_1'$) and/or melamine-based compound ($C_2'$) are/is also present in the aqueous solvent uniformly. However, it is considered that, during the process of coating the composition on the polyester film as a substrate and drying, oxazoline-based compound ($C_1'$) and/or melamine-based compound ($C_2'$) wrap(s) around the metal oxide particles (A) on whose surfaces acrylic resin (B) is adsorbed on/adhered to, since acrylic resin (B) and oxazoline-based compound ($C_1'$), and acrylic resin (B) and melamine-based compound ($C_2'$) have affinities to each other, and the composition is dried maintaining that state, to form a resin layer. It is suspected that a long distance between particles can be maintained even during the process of being concentrated by drying, since particles are wrapped around by oxazoline-based compound ($C_1'$) and/or melamine-based compound ($C_2'$), resulting in the inhibition of particle aggregation.

Component ($C_1$) derived from an oxazoline-based compound in the present invention includes not only the oxazoline-based compound ($C_1'$) described below, but also a component derived from oxazoline-based compound ($C_1'$) (such as a residue), in cases where oxazoline-based compound ($C_1'$) forms a cross-linked structure with acrylic resin (B), an acrylic resin other than (B), melamine-based compound ($C_2'$), or the like.

There is no specific limitation on oxazoline-based compound ($C_1'$) as long as it has at least one or more oxazoline group(s) or oxazine group(s) per 1 molecule, but a high molecular weight type formed by homopolymerization of addition polymerizable oxazoline group-containing monomers, or copolymerization of these monomers with other monomers, is preferred.

Examples of the addition polymerizable oxazoline group-containing monomer include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These monomers may be used alone or as a mixture of two or more. Among these, 2-isopropenyl-2-oxazoline is suitable because of its industrial availability. Other monomers can be used without limitation as long as they are monomers that are copolymerizable with addition polymerizable oxazoline group-containing monomers. Examples thereof include (meth) acrylic acid esters such as alkyl acrylate and alkyl methacrylate (examples of the alkyl groups include a methyl group, ethyl group, n-propyl group, isopropyl group, n-butyl group, isobutyl group, t-butyl group, 2-ethylhexyl group, and cyclohexyl group); unsaturated carboxylic acids such as acrylic acid, methacrylic acid, itaconic acid, maleic acid, fumaric acid, crotonic acid, styrene sulfonic acid and salts thereof (such as sodium salt, potassium salt, ammonium salt, and tertiary amine salt); unsaturated nitriles such as acrylonitrile and methacrylonitrile; unsaturated amides such as acrylamide, methacrylamide, N-alkyl acrylamide, N-alkyl methacrylamide, N,N-dialkyl acrylamide, and N,N-dialkyl methacrylamide (examples of the alkyl groups include a methyl group, ethyl group, n-propyl group, isopropyl group, n-butyl group, isobutyl group, t-butyl group, 2-ethylhexyl group, and cyclohexyl group); vinyl esters such as those in which polyalkylene oxide is added to the ester moiety of vinyl acetate, vinyl propionate, acrylic acid, and methacrylic acid; vinyl ethers such as methyl vinyl ether and ethyl vinyl ether; α-olefins such as ethylene and propylene; halogen-containing α,β-unsaturated monomers such as vinyl chloride, vinylidene chloride and vinyl fluoride; and α,β-unsaturated aromatic monomers such as styrene and α-methyl styrene; and the like. These monomers can be used alone or as a mixture of two or more.

Component ($C_2$) derived from a melamine-based compound in the present invention includes not only the melamine-based compound ($C_2'$) described below, but also a component derived from a melamine-based compound ($C_2'$) (such as a residue), in cases where melamine-based compound ($C_2'$) forms a cross-linked structure with acrylic resin (B), an acrylic resin other than (B), oxazoline-based compound ($C_1'$) or the like.

As melamine-based compound ($C_2'$), for example, melamine, a methylolated melamine derivative obtained by condensation of melamine and formaldehyde, a partially or completely esterified compound obtained by reacting methylolated melamine with a lower alcohol, and a mixture thereof can be used. Specifically, a compound containing triazine and a methylol group is particularly preferred. The melamine-based compound may be a monomer, a condensation product of a polymer which is a dimer or a polymer higher than dimer, or a mixture thereof. As the lower alcohol used for the etherification, methyl alcohol, ethyl alcohol, isopropyl alcohol, n-butanol, isobutanol and the like can be used. Examples include those containing an imino group, a methylol group, or an alkoxy methyl group such as a methoxymethyl group or a butoxy methyl group, within 1 molecule; such as imino group type methylated melamine resin, methylol group type melamine resin, methylol group type methylated melamine resin, and complete alkyl type methylated melamine resin. Among these, methylolated melamine resin is most preferred. Further, in order to promote heat curing of the melamine-based compound, an acid catalyst such as p-toluenesulfonic acid may be used.

As aforementioned, use of such melamine-based compound ($C_2'$) enables to inhibit the aggregation of metal oxide particles (AB) during the drying process of the resin composition, and to increase the transparency and reflection ratio of the resin layer. As a result, a laminated film excellent in transparency, adhesion and visibility upon lamination of a hard coat layer can be obtained.

In the present invention, component ($C_1$) derived from an oxazoline-based compound and/or component ($C_2$) derived from a melamine-based compound can be used in any amount, as long as the effects of metal oxide particles (A) and acrylic resin (B) are not compromised.

The amount of oxazoline-based compound ($C_1'$), which is a material for component ($C_1$) derived from an oxazoline-based compound, and melamine-based compound ($C_2'$), which is a material for component ($C_2$) derived from a melamine-based compound is preferably from 10 to 50 parts by mass, more preferably from 15 to 45 parts by mass, relative to 100 parts by mass of the total amount of metal oxide particles (A) and acrylic resin (B). If the content is 10 parts by mass or more, the effects of component ($C_1$) derived from an oxazoline-based compound and/or component ($C_2$) derived from a melamine-based compound in the resin layer can be obtained.

Further, in addition to component ($C_1$) derived from an oxazoline-based compound and/or component ($C_2$) derived from a melamine-based compound, other compounds such as carbodiimide-based compounds, epoxy compounds, aziridine compounds, amide epoxy compounds, titanate-based coupling agents such as titanium chelate, methylolated or alkylolated urea-based compounds, and acrylamide-based compounds can also be used optionally.

[Polyester Film]

The polyester film which is used as a substrate film in the laminated film of the present invention will now be described. Firstly, polyester is a general term referring to polymers having an ester bond(s) in the main chain, and those having as a component at least one selected from ethylene terephthalate, propylene terephthalate, ethylene-2,6-naphthalate, butylene terephthalate, propylene-2,6-naphthalate, and ethylene-α,β-bis(2-chlorophenoxy)ethane-4,4'-dicarboxylate can be suitably used.

A polyester film using the above mentioned polyester is preferably one that is biaxially oriented. A biaxially oriented polyester film generally refers to a film obtained by stretching an unstretched polyester sheet or film to about 2.5 to 5 times the original length in the longitudinal direction and in the width direction orthogonal to the longitudinal direction, respectively, followed by heat treatment to complete the crystal orientation, which film exhibits biaxially oriented pattern in wide-angle x-ray diffraction. When the polyester film is biaxially oriented, the film has sufficient thermal stability, particularly dimensional stability, sufficient mechanical strength, and a good planarity.

Further, various additives such as antioxidants, thermal stabilizers, weather stabilizers, ultraviolet light absorbers, organic lubricants, pigments, dyes, organic or inorganic fine particles, fillers, antistatic agents, and nucleus formation agent may be added to the polyester film to the extent that the properties thereof are not compromised.

The thickness of the polyester film is not specifically limited, and it is selected as appropriate depending on the application and the type. In general, the thickness is preferably from 10 to 500 μm, more preferably, from 38 to 250 μm, most preferably, from 75 to 150 μm, in terms of mechanical strength and handleability. The polyester film may be a composite film obtained by coextrusion, or a film obtained by laminating the resulting films using a variety of methods.

[Resin Composition for Resin Layer and Preparation Method Thereof]

The resin composition for the resin layer of the present invention contains a resin which contains at least the aforementioned metal oxide particles (A), and the aforementioned acrylic resin (B), and oxazoline-based compound ($C_1'$) and/or melamine-based compound ($C_2'$), wherein the metal oxide particles have a number average particle diameter of 3 nm or more and 50 nm or less.

The resin composition may contain an acrylic resin other than (B), and other compounds such as a carbodiimide compound, an epoxy compound, an aziridine compound, an amide epoxy compound, a titanate-based coupling agent such as titanium chelate, a methylolated or alkylolated urea-based compound, and an acrylamide-based compound, as necessary.

In addition, various additives such as organic lubricants, organic or inorganic fine particles, and antistatic agents may be added to the resin composition to the extent that the properties thereof are not compromised.

The resin composition using an aqueous solvent can be prepared by: adding at least acrylic resin (B) that are water-dispersed or water solubilized and metal oxide particles (A) in the order of (A) and then (B); dispersing the resultant so that acrylic resin (B) is adsorbed on the surfaces of metal oxide particles (A); then adding oxazoline-based compound ($C_1'$) and/or melamine-based compound ($C_2'$) to the resultant; and adding an aqueous solvent at a desired mass ratio followed by mixing and stirring. Then, polyester resin (D) having a fluorene structure and/or various types of additives (such as lubricants, inorganic particles, organic particles, surfactants, and antioxidants) can be added as required to the above described resin composition at a desired mass ratio, followed by mixing and stirring, to obtain the resin composition.

Addition of acrylic resin (B) to the metal oxide particles (A) and dispersion of the resultant can be carried out using a paint shaker, a SC mill, an annular mill, a pin mill and the like, usually rotating at a peripheral speed of from 5 to 15 m/s. The rotation time is from 5 to 10 hours. Use of dispersion beads such as glass beads upon dispersion is preferred in terms of increasing the dispersibility. The bead diameter is preferably from 0.05 to 0.5 mm, more preferably, from 0.08 to 0.5 mm, and particularly preferably, from 0.08 to 0.2 mm.

Mixing and stirring can be carried out by shaking the container with hand, using a magnetic stirrer or an impeller, or by performing ultrasonic irradiation and vibrational dispersion.

Acrylic resin (B) which is water-dispersed or water solubilized can be prepared by methods such as copolymerization, emulsification polymerization using a reactive emulsifier or a surfactant, suspension polymerization, or soap-free polymerization of an acrylic resin and a monomer having a hydrophilic group(s) (such as acrylic acid, methacrylic acid, acrylamide, vinyl sulfonic acid or a salt thereof).

As the polymerization initiators, common radical polymerization initiators can be used, but not specifically limited thereto. Examples thereof include water soluble peroxides such as potassium persulfate, ammonium persulfate, and hydrogen peroxide; oil soluble peroxides such as benzoyl peroxide and t-butyl hydroperoxide; and azo compounds such as azodiisobutyronitrile.

[Method for Forming Resin Layer and Method for Producing Laminated Film]

In the present invention, a resin layer can be formed on a polyester film by coating a resin composition containing at least metal oxide particles (A), acrylic resin (B), oxazoline-based compound ($C_1'$) and/or melamine-based compound ($C_2'$) on the polyester film, and in cases where the resin composition contains a solvent, by drying the solvent.

Further, in the present invention, in cases where a solvent is incorporated in the resin composition, use of an aqueous solvent as the solvent is preferred. Use of an aqueous solvent is advantageous not only because it enables to prevent rapid evaporation of the solvent during the drying process and to form a uniform composition layer, but also in terms of environmental stress.

The aqueous solvent herein refers to water, or to a mixture of water and organic solvents that are soluble in water, mixed at an arbitrary ratio. Examples of the organic solvent include alcohols such as methanol, ethanol, isopropyl alcohol, butanol; ketones such as acetone and methyl ethyl ketone; and glycols such as ethylene glycol, diethylene glycol and propylene glycol.

It is important that the resin composition is coated on the polyester film using an in-line coating method. The in-line coating method is a method in which coating is carried out during the production process of the polyester film. Specifically, it refers to a method in which coating is carried out at an arbitrary stage from when the polyester resin is melt extruded until when the resin is biaxially stretched, then heat treated, and winded. The coating is generally performed on any of the following films: a unstretched (unoriented) polyester film obtained by rapidly cooling the film after melt extrusion and which is substantially in an amorphous state (A film); a uniaxially stretched (uniaxially oriented) polyester film which is stretched in longitudinal direction (B film); or a biaxially stretched (biaxially oriented) polyester film before the heat treatment which is further stretched in width direction (C film).

In the present invention, it is preferable to use a method in which the resin composition is coated on either of the above mentioned A film or B film whose crystal orientation is not yet completed, and the polyester film is then stretched in uniaxial direction or biaxial direction, followed by heat treatment at a temperature higher than the boiling point of the solvent, to complete the crystal orientation of the polyester film and to form a resin layer. Use of this method is advantageous in terms of production cost, because it enables to perform formation of the polyester film, and coating and drying of the resin composition (that is, formation of the resin layer) simultaneously. Further, a thinner resin layer can be obtained easily, because the stretching is performed after the coating.

Among these, an advantageous method is one in which the resin composition is coated on a film which is uniaxially stretched in longitudinal direction (B film), and then the film is stretched in width direction, followed by heat treatment. That is because, defects or cracks in the composition layer due to stretching are less likely to occur and a composition layer excellent in transparency and smoothness can be formed, since the method has one less stretching process compared to the method in which the resin composition is coated on a unstretched film and then stretched biaxially.

It is important in the present invention that the resin layer is formed by an in-line coating method, considering the various advantages described above. Here, coating of the resin composition on the polyester film can be carried out using any of the known coating methods such as a bar coating method, a reverse coating method, a gravure coating method, a die coating method and a blade coating method.

Therefore, the best way to form the resin layer in the present invention is a method in which the resin composition using an aqueous solvent is coated on a polyester film using an in-line coating method, followed by drying and heat treatment. More preferred is a method in which the resin composition is coated on B film which has been stretched uniaxially, using an in-line coating. In the method for producing the laminated film of the present invention, drying can be performed within a temperature range of from 80 to 130° C. in order to complete the removal of the solvent in the resin composition. Further, the heat treatment can be performed within a temperature range of from 160 to 240° C., in order to complete the crystal orientation of the polyester film and the heat-curing of the resin composition, and to complete the formation of the resin layer.

The solids concentration of the resin composition is preferably 10% by mass or less. A solids concentration of 10% by mass or less enables to impart good coating properties to the resin composition, and to produce a laminated film having a transparent and uniform composition layer.

The solids concentration refers to the ratio of the mass of the remainder calculated by subtracting the mass of the solvent from the mass of the resin composition, relative to the mass of the resin composition (that is, [solids concentration]=[(mass of the resin composition)−(mass of the solvent)]/[mass of the resin composition]).

The method for producing the laminated film of the present invention will now be described with reference to the example in which a polyethylene terephthalate (hereinafter referred to as "PET") film is used as the polyester film, but not limited thereto. Firstly, PET pellets are supplied to an extruder after sufficiently vacuum dried, and the resultant is melt extruded at about 280° C. in the form of sheet, followed by cooling and solidifying to prepare a unstretched (unoriented) PET film (A film). This film is stretched to 2.5 to 5.0 times the original length in longitudinal direction using rolls heated to 80 to 120° C. to obtain a uniaxially oriented PET film (B film). The resin composition of the present invention prepared to a predetermined concentration is then coated on one side of this B film.

Before the coating, the coating surface of the PET film may be subjected to a surface treatment such as corona discharge treatment. By performing a surface treatment such as corona discharge treatment, wettability of the resin composition to the PET film is improved, the cissing of the resin composition is prevented, and a resin layer having a uniform thickness can be formed. After the coating, end regions of the PET film are held with clips and transferred to a heat treatment zone (preheating zone) controlled at a temperature of 80 to 130° C., to dry the solvent in the resin composition. After drying, the PET film is stretched to 1.1 to 5.0 times the original length in width direction. The film is then transferred to a heat treatment zone (heat-setting zone) controlled at 160 to 240° C., and subjected to heat treatment for 1 to 30 seconds, to complete the crystal orientation.

During this heat treatment process (heat-setting process), a relaxation treatment of 3 to 15% may be carried out in width direction or in longitudinal direction as required. The laminated film thus obtained is a laminated film that is transparent and excellent in anti-reflection properties.

The thickness of the resin layer in the present invention is preferably 10 nm or more and 50 nm or less, more preferably, 10 nm or more and 45 nm or less, still more preferably 10 nm or more and 40 nm or less. If the thickness of the resin layer is 10 nm or more and 50 nm or less, the interference pattern can be sufficiently suppressed. Further, it has been found that if the film thickness is less than 15 nm, the aggregation of the metal oxide particles can be inhibited and the reflection ratio can be improved. Although the detailed mechanism is unknown, a thinner coating film reduces the probability of particle contact during the drying process, which in turn leads to inhibition of the aggregation between particles, and to a reduced roughness of the coating film surface. It is presumed that, the diffused light on the surface of the coating film is thereby decreased, resulting in an improvement in the reflection ratio.

[Property Measurement Methods and Effect Evaluation Methods]

The property measurement methods and the effect evaluation methods in the present invention are as follows.

(1) Total Light Transmittance/Initial Haze Evaluation

Measurements of total light transmittance and initial haze were performed using a turbidity meter "NDH5000" manufactured by NIPPON DENSHOKU INDUSTRIES Co., LTD. after a laminated film sample was left to stand for 40 hours in an ordinary state (23° C., relative humidity of 50%). The total light transmittance was measured according to JIS K 7361-1 "Test method of total light transmittance of transparent plastic material" (1997 version), and the initial haze was measured according to JIS K 7136 "Method for obtaining haze of transparent materials" (2000 version). Measurements were carried out while irradiating light from both sides of the sample on which resin layer is laminated. Ten samples of 50 mm square were prepared, and each sample was measured once, and the mean value of 10 measurements was determined as the haze value of the sample.

(2) Reflection Ratio

A film sheet cut into the size of A4 was divided in 3 in both lengthwise and crosswise, and 9 pieces in total are used as measurement samples. The longer side is determined as the longitudinal direction. For the measurement of the spectral reflectivity, a 50 mm-wide black glossy tape (vinyl tape No. 200-50-21: black, manufactured by YAMATO CO., LTD.) was applied to the back surface of the measuring plane (the resin layer) in such a way that the longitudinal directions of the sample and the tape correspond, with care to eliminate bubbles. A sample piece of about 4 cm square was then cut out, and the spectral reflectivity was measured using a spectrophotometer (UV2450, manufactured by Shimadzu Corporation) at an incident angle of 5°. The sample was set in the measuring apparatus such that the longitudinal direction of the sample corresponds to the back and forth direction of the apparatus, facing the front of the apparatus.

In order to normalize the reflection ratio, an $Al_2O_3$ board appended was used as a standard reflector. The reflection ratio of the resin layer-side at a wavelength of 550 nm was measured as the reflection ratio. The mean value of the measurements of 10 samples was used as the measured value.

(3) Adhesion to a Laminate

A UV curable resin mixed at the following ratio was coated uniformly on the resin layer-side of the laminated film using a bar coater to a film thickness after curing of 2 μm.

Preparation of hard coat agent

Titanium dioxide fine particles (TTO-55B, manufactured by ISHIHARA SANGYO KAISHA, LTD.): 30 parts by mass Carboxylic acid group-containing monomer (ARONIX M-5300, manufactured by TOAGOSEI CO., LTD.): 4.5 parts by mass Cyclohexanone: 65.5 parts by mass The above described mixture was dispersed using a sand grinder mill to prepare a dispersion liquid of titanium dioxide fine particles having an average particle diameter of 55 nm.

To the above described dispersion liquid of titanium dioxide fine particles were added dipentaerythritol hexaacrylate (DPHA, manufactured by Nippon Kayaku Co., Ltd.), and a light initiator (Irgacure184, manufactured by Nihon Ciba-Geigy K.K.) in an amount of 5% by mass relative to the total amount of monomers (the total amount of dipentaerythritol hexaacrylate and anionic monomers), and the resultant was mixed, and prepared so that the refractive index of the hard coat layer becomes 1.65.

Then, using a concentrator type high-pressure mercury vapor lamp (H03-L31, manufactured by EYE GRAPHICS CO., LTD.) having an irradiation strength of 120 W/cm, which was set at 9 cm-height from the surface on which the UV curable resin layer was laminated, ultraviolet light was irradiated so as to achieve the integrated irradiation intensity of 300 mJ/cm$^2$, and the resin layer was cured to obtain a hard coat-laminated polyester film, which is a polyester film on which a hard coat layer is laminated. For the measurement of the integrated irradiation intensity of ultraviolet light, an industrial UV checker (UVR-N1, manufactured by Japan Storage Battery Co., Ltd.) was used. As for the resulting hard coat-laminated polyester film, 100 cross-cuts of 1 mm$^2$ were made on the hard coat-laminated surface of the resulting hard coat-laminated polyester film, and "Cellotape (registered trademark)" (CT405AP, manufactured by NICHIBAN CO., LTD.) was applied thereon. After pressing the tape with a hand roller at a load of 1.5 kg/cm$^2$, the tape was quickly peeled off in the 90-degree direction to the hard coat-laminated polyester film. Adhesion was evaluated in four stages based on the number of squares left on the film. Those with practical problems were determined as C, those qualified for practical use were determined as B, and those having a good adhesion were determined as A and S.

S: 90 to 100 squares left
A: 80 to 89 squares left
B: 50 to 79 squares left
C: less than 0 to 50 squares left (4) Adhesion Under High Temperature and High Humidity Conditions A hard coat layer was laminated on the resin layer-side of the laminated polyester film in the same manner as in (3), to obtain a hard coat-laminated polyester film. Further, the resulting hard coat-laminated polyester film was left to stand in a constant temperature and humidity tank controlled at a temperature of 70° C. and a relative humidity of 90% for 240 hours, to obtain a test sample for adhesion under high temperature and high humidity conditions. The resulting test sample for adhesion under high temperature and high humidity conditions was tested for adhesion in the same manner as in (3), and evaluated in 4 stages based on the number of squares left on the film.

Those with practical problems were determined as C, those qualified for practical use were determined as B, and those having a good adhesion were determined as A and S.

S: 90 to 100 squares left
A: 80 to 89 squares left
B: 50 to 79 squares left
C: less than 0 to 50 squares left.

(5) Number Average Particle Diameter

The number average particle diameter of metal oxide particles (B) was obtained by observing the cross-section structure of the laminated film using a transmission electron microscope (TEM). At a magnification of 500,000-fold, the outer diameters of 10 particles present within the image plane were measured. Measurements were performed in 10 visual fields for the total of 100 particles, and the average particle diameter thereof was calculated. In cases where 10 particles do not exist within the image plane, a different location was observed under the same conditions, and the outer diameters of the particles present within the image plane were measured.

Measurements were performed for the total of 100 particles, and the mean value thereof was calculated. The outer diameter herein refers to the maximum diameter of a particle (that is, the longer diameter of the particle, which is the longest diameter of the particle). In cases where a particle contains a cavity inside, it also refers to the maximum diameter of the particle.

(6) Thickness of Resin Layer

The thickness of the resin layer on the polyester film was measured by observing its cross section using a transmission electron microscope (TEM). The thickness of the resin layer is read from the image captured by TEM at a magnification of 200,000-fold. The resin layer thickness was measured at 20 points in total, and the mean value thereof was calculated.

(7) Visibility (Interference Pattern)

The same procedure as in (3) was performed to obtain a hard coat-laminated polyester film in which a 2 μm-thick hard coat layer (refractive index of 1.65) is laminated on the laminated polyester film.

Then, a sample in a size of 8 cm (the width direction of the laminated polyester film)×10 cm (the longitudinal direction of the laminated polyester film) was cut out from the resulting laminated film for optical use, and a black glossy tape (vinyl tape No. 200-50-21: black, manufactured by YAMATO CO., LTD.) was applied on the opposite side of the hard coat layer, with care to eliminate bubbles.

This sample was placed in a dark room 30 cm directly under a three-wave length fluorescent lamp (three-wave-length daylight white (F•L 15EX-N 15W), manufactured by Panasonic Corporation), and the degree of interference pattern was observed visually, changing the visual angle. Those qualified as A or better were determined as good.

S: virtually free of interference pattern
A: slight interference pattern is observed
B: weak interference pattern is observed.
C: strong interference pattern is observed.

(8) Composition Analysis of Resin Layer

The composition analysis of the resin layer was performed by analyzing the surface of the laminated film using an x-ray photoelectron spectroscopy apparatus (ESCA), Fourier transform infrared spectrophotometer (FT-IR) ATR method, and Time of Flight Secondary Ion Mass Spectrometry (TOF-SIMS). Further, the resin layer was dissolved in and extracted with a solvent, and the resultant was fractionated by chromatography. The structural analysis was then performed using proton nuclear magnetic resonance spectroscopy (1H-NMR), carbon nuclear magnetic resonance spectroscopy ($^{13}$C-NMR) and Fourier transform infrared spectrophotometer (FT-IR), followed by composition analysis of the resin layer using pyrolysis gas chromatography-mass spectrometry (GC-MS).

Using the above described methods, the presences or absences of metal oxide particles (A), particles (AB), acrylic resin (B), oxazoline-based compound ($C_1'$), component ($C_1$) derived from an oxazoline-based compound, melamine-based compound ($C_2'$), and component ($C_2$) derived from a melamine-based compound, in the resin layer were confirmed.

Those containing the above compounds in the resin layer are determined as A, and those not containing the above compounds are determined as B.

EXAMPLES

Properties and so on of the resulting laminated films obtained in the following Examples and Comparative Examples are shown in Table 1 to Table 4.

Example 1

Firstly, resin composition 1 was prepared as follows.
Metal Oxide Particles (A):

Zirconium oxide dispersion liquid SZR-CW (zirconium oxide particles manufactured by Sakai Chemical Industry Co., Ltd.: number average particle diameter of 20 nm) was used as metal oxide particles.
Acrylic Resin (B):

Into a regular acrylic resin reaction vessel equipped with an agitator, thermometer, and reflux condenser, 100 parts of isopropyl alcohol as a solvent was charged, and the resultant was heated with stirring and maintained at 100° C.

To the reaction vessel, a mixture of 40 parts of nonadecyl methacrylate wherein n=19 as (meth)acrylate ($b_1'$), 40 parts of isobonyl methacrylate having 2 rings as (meth)acrylate ($b_2'$), and 20 parts of 2-hydroxyethyl acrylate as (meth)acrylate ($b_3'$) having a hydroxyl group, was added dropwise over 3 hours. After the dropwise addition was completed, the resultant was heated at 100° C. for 1 hour, and an additional catalyst mixture liquid composed of 1 part of t-butylperoxy-2-ethylhexaate was charged. The resultant was heated at 100° C. for 3 hours followed by cooling, to obtain acrylic resin (B). The structural formula of the resulting acrylic resin (B) is shown below.

(It should be noted that this structural formula merely represents that $b_1'$, $b_2'$, and $b_3'$ are contained within its chemical structure, and does not define the order or the number of each of the structural units.)

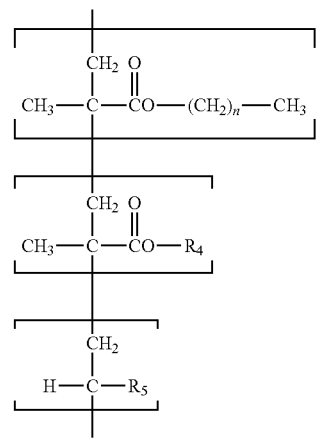

(In the formula, $R_4$ group represents a group having 2 or more saturated hydrocarbon ring; and $R_5$ group represents a hydroxyl group, a carboxyl group, a tertiary amino group, a quaternary ammonium salt group, a sulfonic acid group, or a phosphate group).
Aqueous Solvent: Pure Water.
Mixture of Particles (AB) and Acrylic Resin (B):

In an aqueous solvent, the above described metal oxide particles (A) and the above described acrylic resin (B) were added in this order, and dispersed according to the method below to obtain a mixture of particles (AB) and acrylic resin (B). (Method of the above described (ii)). The ratio of the added amount (mass ratio) of metal oxide particles (A) to acrylic resin (B) was (A)/(B)=45/10 (mass ratio was obtained by rounding off to one decimal place). Dispersion treatment was carried out using a homomixer by rotating the mixer at a peripheral speed of 10 m/s for 5 hours. The mass ratio of particles (AB) to acrylic resin (B) in the resulting final mixture was (AB)/(B)=45/10 (mass ratio was obtained by rounding off to one decimal place).

The resulting particles (AB) were then subjected to centrifuge separation using Hitachi Tabletop-Ultracentrifuge (CS150NX: manufactured by Hitachi Koki Co., Ltd.) (rotational speed: 3,000 rpm, separation time: 30 minutes), and after precipitating metal oxide particles (A) (and acrylic resin (B) adsorbed on the surfaces of metal oxide particles (A)), supernatant was removed and the precipitate was concentrated to dryness. As a result of analyzing the precipitate that was concentrated to dryness, using X-RAY PHOTOELECTRON SPECTROSCOPY (XPS), the presence of acrylic resin (B) on the surfaces of metal oxide particles (A) was confirmed. That is, acrylic resin (B) was adsorbed on/adhered to the surfaces of metal oxide particles (A), and it was confirmed that the resulting particles (AB) were metal oxide particles (A) having acrylic resin (B) on the surfaces thereof.
Resin Composition 1:

To an aqueous solvent, the above described particles (AB) and acrylic resin (B), and a mixture of oxazoline-based compound (1) as oxazoline-based compound ($C_1'$) were added in this order to obtain a resin composition. (The mass ratio of particles (AB), acrylic resin (B) and oxazoline-based compound ($C_1'$) in the resin composition is (AB)/(B)/(C1')=50/15/35).
Oxazoline-Based Compound (1):
　　Methyl methacrylate: 50 parts by mass
　　Ethyl acrylate: 25 parts by mass
　　Styrene: 5 parts by mass
　　2-isopropenyl-2-oxazoline: 20 parts by mass Coating solution obtained by diluting an oxazoline group-containing resin composition obtained by copolymerization of the above materials at the above composition, in a mixed solvent of propylene glycol monomethyl ether and water (20/80 (mass ratio)).

Laminated Film

Then, after PET pellets (intrinsic viscosity: 0.63 dl/g) which did not substantially contain particles were sufficiently vacuum dried, the resultant was supplied to an extruder, fused at 285° C., and extruded in the form of sheet through a T-shaped mouthpiece. The resulting sheet was then wound about a mirror surface casting drum whose surface temperature was 25° C., using a static electricity-applying method followed by cooling and solidification. This unstretched film was heated to 90° C. and stretched to 3.4 times the original length in longitudinal direction to obtain a uniaxially stretched film (B film).

Then resin composition 1 was coated on the corona discharge treated-surface of the uniaxially stretched film using a bar coat to achieve a coating thickness of about 6 μm. Both end regions in the width direction of the uniaxially stretched film coated with the resin composition were held with clips and transferred to a preheating zone controlled at an atmosphere temperature of 75° C. Then the atmosphere temperature was elevated to 110° C. using a radiation heater, followed by lowering the atmosphere temperature to 90° C. to dry the resin composition and to form a resin layer. The resultant was then serially stretched to 3.5 times the original length in width direction in a heating zone (stretching zone) controlled at 120° C., followed by heat treatment in a heat treatment zone (heat-setting zone) controlled at 230° C. for 20 seconds, to obtain a laminated film whose crystal orientation was completed. In the resulting laminated film, the thickness of the PET film was 100 μm and the thickness of the resin layer was about 0.02 μm.

The properties and so on of the resulting laminated film are shown in Table 1 and Table 3. The resulting laminated film had a low initial haze, a high reflection ratio, and a good transparency, visibility and initial adhesive property, as well as an excellent adhesion under high temperature and high humidity conditions.

Examples 2 to 4

The same procedure as in Example 1 was repeated except that oxazoline-based compound ($C_1'$) was changed to oxazoline-based compound (2) which is an oxazoline-based compound (Example 2); oxazoline-based compound c (Example 3); and "Epocros" (registered trademark) WS-500 (manufactured by NIPPON SHOKUBAI CO., LTD.) (Example 4); respectively, to obtain laminated films.

Oxazoline-Based Compound (2):
  Methyl methacrylate: 50 parts by mass
  Ethyl acrylate: 25 parts by mass
  Styrene: 5 parts by mass
  2-isopropenyl-5-ethyl-2-oxazoline: 20 parts by mass
  Coating solution obtained by diluting an oxazoline group-containing resin composition obtained by copolymerization of the above materials at the above composition, in a mixed solvent of propylene glycol monomethyl ether and water (20/80 (mass ratio)).

Oxazoline-Based Compound (3):
  Methyl methacrylate: 50 parts by mass
  Ethyl acrylate: 25 parts by mass
  Styrene: 5 parts by mass
  2-isopropenyl-2-oxazoline: 20 parts by mass
  Coating solution obtained by diluting an oxazoline group-containing resin composition obtained by copolymerization of the above materials at the above composition, in a mixed solvent of propylene glycol monomethyl ether and water (20/80 (mass ratio)).

The properties and so on of the resulting laminated films are shown in Table 1. As a result of changing the type of the oxazoline-based compounds used, the obtained laminated films had a slightly lower minimum reflection ratio and a slightly higher initial haze, which were still good, and exhibited the same levels of transparency, initial adhesive property, adhesion under high temperature and high humidity conditions, and, visibility, compared to Example 1.

Example 5

The same procedure as in Example 1 was repeated except that oxazoline-based compound ($C_1'$) was changed to "NIKALAC" (registered trademark) MW12LF (manufactured by Sanwa Chemical Co., Ltd.) which is a melamine-based compound, to obtain a laminated film. The properties and so on of the resulting laminated film are shown in Table 1. As a result of changing the oxazoline-based compound ($C_1'$) to melamine-based compound, the obtained laminated film was in good condition having a low initial haze and a high reflection ratio, and exhibited the same levels of transparency, initial adhesive property, adhesion under high temperature and high humidity conditions, and visibility, compared to Example 1.

Example 6

The same procedure as in Example 1 was repeated except that oxazoline-based compound ($C_1'$) was changed to melamine compound (1) which is a melamine-based compound, to obtain a laminated film.

Melamine Compound (1):
  Coating solution obtained by diluting "BECKAMIN" (registered trademark) APM (manufactured by DIC Corporation) with water.

The properties and so on of the resulting laminated film are shown in Table 1 and Table 3. As a result of changing the type of the melamine-based compound used, the obtained laminated film had a slightly lower minimum reflection ratio and a slightly higher initial haze, which were still good, and exhibited the same levels of transparency, initial adhesive property, adhesion under high temperature and high humidity conditions, and visibility, compared to Example 1.

Examples 7 to 12

The same procedure as in Example 1 was repeated except that, in addition to oxazoline-based compound ($C_1'$), "NIKALAC" (registered trademark) MW12LF (manufactured by Sanwa Chemical Co., Ltd.) which is a melamine-based compound was used in combination, and its amount was changed, respectively, to obtain laminated films.

The properties and so on of the resulting laminated films are shown in Table 1 and Table 3. As a result of using melamine-based compound in combination, the obtained laminated films were in good condition having the same level of reflection ratio, a lower initial haze, and an excellent transparency, initial adhesive property, adhesion under high temperature and high humidity conditions, and visibility, compared to Example 1.

Example 13

The same procedure as in Example 9 was repeated except that metal oxide particles (A) were changed to "NanoTek"

TiO$_2$ slurry (manufactured by C.I. KASEI CO. LTD., number average particle diameter of 20 nm) which is titanium oxide particles shown in Table 1, to obtain a laminated film.

As a result of using titanium oxide particles having a high refractive index, the obtained laminated film was in good condition having the same level of initial haze and a slightly higher reflection ratio, and exhibited the same levels of transparency, initial adhesive property, adhesion under high temperature and high humidity conditions, and visibility, compared to Example 9.

Examples 14 to 16

The same procedure as in Example 9 was repeated except that metal oxide particles (A) were changed to FINEX-50 (manufactured by Sakai Chemical Industry Co., Ltd., number average particle diameter of 20 nm) which is zinc oxide particles (Example 14); "NanoTek" ITO slurry (manufactured by C.I. KASEI CO. LTD., number average particle diameter of 20 nm) which is indium-doped tin oxide (Example 15); and "NanoTek" Y$_2$O$_3$ slurry (manufactured by C.I. KASEI CO. LTD., number average particle diameter of 20 nm) which is yttrium oxide (Example 16); respectively, which are shown in Table 1, to obtain laminated films.

The resulting laminated films had a slightly higher initial haze and a slightly lower reflection ratio, which were still good, and a slightly poorer but good transparency, adhesion under high temperature and high humidity conditions and visibility, and the same level of initial adhesive property, compared to Example 9.

Example 17

The same procedure as in Example 1 was repeated except that the number average particle diameter of metal oxide particles (A) was changed to 3 nm.

The resulting laminated film had a slightly higher initial haze and a slightly lower reflection ratio, which were still good, a slightly poorer initial adhesive property to a laminate, and the same levels of transparency, adhesion under high temperature and high humidity conditions, and visibility, compared to Example 1.

Examples 18 to 20

The same procedure as in Example 1 was repeated except that the number average particle diameter of metal oxide particles (A) was changed to 15 nm (Example 18); 30 nm (Example 19); and 50 nm (Example 20); respectively, to obtain laminated films.

The resulting laminated films had the same level of initial haze, a slightly lower but good reflection ratio, and the same levels of transparency, initial adhesive property, adhesion under high temperature and high humidity conditions, and visibility, compared to Example 1.

Examples 21 to 22

The same procedure as in Example 1 was repeated except that the added amount of metal oxide particles (A) was changed to 20 parts by mass (Example 21) and 30 parts by mass (Example 22), respectively, to obtain laminated films.

The resulting laminated films were in good condition having the same levels of initial haze, reflection ratio, transparency, initial adhesive property, adhesion under high temperature and high humidity conditions, and visibility, as Example 1.

Examples 23 to 24

The same procedure as in Example 1 was repeated except that the added amount of metal oxide particles (A) was changed to 50 parts by mass (Example 23) and 70 parts by mass (Example 24), respectively, to obtain laminated films.

The resulting laminated films had a slightly higher initial haze and a slightly higher reflection ratio, which were still good, a slightly poorer initial adhesive property, and the same levels of transparency, adhesion under high temperature and high humidity conditions, and visibility, compared to Example 1.

Examples 25 to 27

The same procedure as in Example 1 was repeated except that (meth)acrylate monomer (b1') was changed to decyl methacrylate wherein n=9 (Example 25); pentatriacontyl methacrylate wherein n=34 (Example 26); and nanodecyl methacrylate wherein n=19 (Example 27); respectively, which are shown in Table 1, to obtain laminated films.

The properties and so on of the resulting laminated film are shown in Table 2 and Table 4. The resulting laminated films were in good condition having the same levels of initial haze, reflection ratio, transparency, initial adhesive property, adhesion under high temperature and high humidity conditions, and visibility, as Example 1.

Example 28

The same procedure as in Example 1 was repeated except that (meth)acrylate monomer (b$_2$') was changed to isobonyl methacrylate having two saturated hydrocarbon ring to obtain a laminated film.

The properties and so on of the resulting laminated film are shown in Table 2 and Table 4. The resulting laminated film was in good condition having the same levels of initial haze, reflection ratio, transparency, initial adhesive property, adhesion under high temperature and high humidity conditions, and visibility, as Example 1.

Examples 29 to 32

The same procedure as in Example 1 was repeated except that the added amount of acrylic resin (B) was changed to the amounts shown in Table 1, respectively, to obtain laminated films.

The properties and so on of the resulting laminated films are shown in Table 2 and Table 4. As a result of decreasing the added amount of acrylic resin (B), metal oxide particles (A) were slightly more prone to aggregation, and the resulting laminated films had a slightly higher initial haze and a slightly lower reflection ratio, which were still good, and the same levels of transparency, initial adhesive property, adhesion under high temperature and high humidity conditions, and visibility, compared to Example 1.

Examples 33 to 34

Resin Compositions 2 to 5

Firstly, resin compositions 2 to 5 were prepared as follows.

To resin composition 1, water dispersion (D$_1$aq) of fluorene copolymer polyester resin which is polyester resin (D) having a fluorene structure was added, and the resultant was mixed to obtain resin compositions 2 to 5.

The mass ratio of particles (AB), acrylic resin (B), oxazoline-based compound ($C_1'$), and polyester resin (D) having a fluorene structure in each of resin compositions 2 to 5 is as follows.

Resin composition 2: (AB)/(B)/($C_1'$)/(D)=50/15/35/5
Resin composition 3: (AB)/(B)/($C_1'$)/(D)=50/15/35/10
Resin composition 4: (AB)/(B)/($C_1'$)/(D)=50/15/35/20
Resin composition 5: (AB)/(B)/($C_1'$)/(D)=50/15/35/30

Preparation of Polyester Resin (D-1) Copolymerized with Fluorene

Into an ester exchange reactor, 75 parts by mole of succinic acid dimethyl as dicarboxylic acid component ($Da_2$) having no fluorene structure, 80 parts by mole of 9,9-bis[4-(2-hydroxyethoxy)phenyl]fluorene as glycol component ($Db_1$) having a fluorene structure, and 20 parts by mole of ethylene glycol as glycol component ($Db_2$) having no fluorene structure were charged under nitrogen gas atmosphere. To the resultant, 100 parts by weight of tetra butyl titanate (catalyst) was added relative to one million parts by weight of the dicarboxylic acid ester derivative (succinic acid dimethyl), and the mixture was subjected to esterification reaction at 160 to 200° C. for 5 hours, followed by removal of methanol by evaporation. The resultant was further reacted under reduced pressure of 0.2 MPa at 240° C. for 30 minutes, to obtain a polyester polyol.

To the polyester polyol was charged 25 parts by mole of 1,2,4,5-benzene tetracarboxylic acid dianhydride, which is higher-valent carboxylic acid component ($Da_4$) of trivalent or more, and the resultant was reacted at a reaction temperature of from 160 to 180° C. for 3 hours to obtain polyester resin ($D_1$) copolymerized with fluorene. The Tg of the obtained polyester resin was 99° C. The copolymerization amount of glycol component ($Db_1$) having a fluorene structure in polyester resin ($D_1$) copolymerized with fluorene is 40% by mole, relative to 100% by mole of the total amount of dicarboxylic acid component (Da) and glycol component (Db). Further, polyester resin ($D_1$) copolymerized with fluorene is a polyester resin which does not contain dicarboxylic acid component ($Da_3$) containing a sulfonate group.

Preparation of Water Dispersion ($D_1$aq) of Polyester Resin ($D_1$) Copolymerized with Fluorene To 100 parts by weight of the above polyester resin ($D_1$) copolymerized with fluorene, 532 parts by weight of water, 2 parts by weight of 25% by weight aqueous ammonia, and 33 parts of butyl cellosolve were added, and the resultant was dissolved at 40° C. The reaction vessel was then sealed, and the internal temperature of the vessel was elevated to 120° C., and the resultant was reacted for 2 hours to obtain water dispersion ($D_1$aq) of polyester resin copolymerized with fluorene. The composition of water dispersion ($D_1$aq) of polyester resin copolymerized with fluorene is shown below.

Polyester resin ($D_1$) copolymerized with fluorene: 100 parts by weight
Water: 533 parts by weight
Ammonia: 1 parts by weight
Butyl cellosolve: 33 parts by weight The same procedure as in Example 1 was repeated except that resin composition 2 (Example 33); and resin composition 3 (Example 34), containing polyester resin (D) having a fluorene structure, were used as the resin composition, respectively, to obtain laminated films.

The resulting laminated films were in good condition having the same levels of initial haze, reflection ratio, transparency, initial adhesive property, adhesion under high temperature and high humidity conditions, and visibility, as Example 1.

Examples 35 to 36

The same procedure as in Example 1 was repeated except that resin composition 4 (Example 35); and resin composition 5 (Example 36), containing polyester resin (D) having a fluorene structure, were used as the resin composition, respectively, to obtain laminated films.

The obtained laminated films were in good condition having the same level of initial haze, a slightly higher reflection ratio, the same levels of transparency and initial adhesive property, and an excellent adhesion under high temperature and high humidity conditions, and visibility, compared to Example 1.

Examples 37 to 39

The same procedure as in Example 1 was repeated except that (meth)acrylate monomer ($b_3'$) was changed to methacrylic acid having a carboxyl group (Example 37); N,N-dimethylaminoethyl methacrylate having a tertiary amino group (Example 38); and butyl acrylamide sulfonic acid containing a sulfonic acid group (Example 39); respectively, to obtain laminated films.

The properties and so on of the resulting laminated film are shown in Table 2 and Table 4. The resulting laminated films were in good condition having the same levels of initial haze, reflection ratio, transparency, initial adhesive property, adhesion under high temperature and high humidity conditions, and visibility, as Example 1.

Example 40

The same procedure as in Example 9 was repeated except that metal oxide particles (A) were changed to zirconium oxide dispersion liquid SZR-CW (zirconium oxide particles, manufactured by Sakai Chemical Industry Co., Ltd.: number average particle diameter of 20 nm) which is zirconium oxide particles, and "NanoTek" $TiO_2$ slurry (manufactured by C.I. KASEI CO. LTD., number average particle diameter of 20 nm) which is titanium oxide particles, shown in Table 1, to obtain a laminated film.

As a result of using titanium oxide particles having a high refractive index, the obtained film was in good condition having the same level of initial haze and a slightly higher reflection ratio, and exhibited the same levels of transparency, initial adhesive property, adhesion under high temperature and high humidity conditions, and visibility, compared to Example 9.

Example 41

The same procedure as in Example 17 was repeated except that the film thickness was changed to 10 nm, to obtain a laminated film. The obtained laminated film had a lower initial haze; a significantly improved reflection ratio; an excellent transparency, initial adhesive property and visibility; and the same level of adhesion under high temperature and high humidity conditions, compared to Example 17.

Comparative Example 1

The same procedure as in Example 1 was repeated except that metal oxide particles (A) in Example 1 was changed to "SNOWTEX" (registered trademark) CM (manufactured by Nissan Chemical Industries, Ltd., number average particle diameter of 20 nm) which is silica particles, to obtain a laminated film.

As a result of using silica particles, the obtained laminated film had the same level of initial haze; a significantly lower reflection ratio; a good transparency, initial adhesive property, and adhesion under high temperature and high humidity conditions; and a poorer visibility, compared to Example 1.

Comparative Examples 2 to 3

The same procedure as in Example 1 was repeated except that metal oxide particles (A) in Example 1 were changed to "NanoTek" $MgF_2$ slurry (manufactured by C.I. KASEI CO. LTD., number average particle diameter of 20 nm) which is $MgF_2$ particles (Comparative Example 2); and "Sururia" (registered trademark) TR112 (manufactured by JGC C&C, number average particle diameter of 20 nm) which is hollow silica particles (Comparative Example 3); respectively, to obtain laminated films.

As a result of using $MgF_2$ particles (Comparative Example 2) and hollow silica particles (Comparative Example 3), respectively, the obtained laminated films had the same level of initial haze; a significantly lower reflection ratio; a good transparency, initial adhesive property, and adhesion under high temperature and high humidity conditions; and a poorer visibility, compared to Example 1.

Comparative Examples 4 to 6

The same procedure as in Example 1 was repeated except that the particle diameter of metal oxide particles (A) in Example 1 was changed to 2 nm (Comparative Example 4); 70 nm (Comparative Example 5); and 150 nm (Comparative Example 6); respectively, to obtain laminated films.

As a result of using zirconium oxide particles having the number average particle diameter of 2 nm, 70 nm, and 150 nm, respectively, the obtained laminated films had a higher haze, a lower reflection ratio, and a poorer transparency, initial adhesive property, adhesion under high temperature and high humidity conditions, and visibility, compared to Example 1.

Comparative Examples 7 to 8

The same procedure as in Example 1 was repeated except that nonyl methacrylate wherein n=8 (Comparative Example 7); and hexatriacontyl methacrylate wherein n=35 (Comparative Example 8) were used, respectively, instead of (meth)acrylate monomer (b1') in Example 1, to obtain laminated films.

As a result of using nonyl methacrylate wherein n=8, and hexatriacontyl acrylate wherein n=35, respectively, metal oxide particles (A) were more prone to aggregation, and the obtained laminated film had a poorer transparency, initial adhesive property, adhesion under high temperature and high humidity conditions, and visibility, compared to Example 1.

Comparative Example 9

The same procedure as in Example 1 was repeated except that (meth)acrylate monomer ($b_2'$) was changed to cyclopentanyl methacrylate having one cyclic structure, to obtain a laminated film.

The properties and so on of the resulting laminated film are shown in Table 2 and Table 4. As a result of using cyclopentanyl methacrylate having one cyclic structure, metal oxide particles (A) were more prone to aggregation, and the obtained laminated film had a poorer transparency, initial adhesive property, adhesion under high temperature and high humidity conditions, and visibility, compared to Example 1.

Comparative Example 10

The same procedure as in Example 1 was repeated except that oxazoline-based compound ($C_1'$) was not used, to obtain a laminated film.

The properties and so on of the resulting laminated film are shown in Table 2. As a result of not using an oxazoline-based compound, metal oxide particles (A) were more prone to aggregation, and the obtained laminated film had a poorer transparency, initial adhesive property, adhesion under high temperature and high humidity conditions, and visibility, compared to Example 1.

Comparative Example 11

The same procedure as in Example 1 was repeated except that melamine-based compound ($C_2'$) was not used, to obtain a laminated film.

The properties and so on of the resulting laminated film are shown in Table 2 and Table 4. As a result of not using an oxazoline-based compound, metal oxide particles (A) were more prone to aggregation, and the obtained laminated film had a poorer transparency, initial adhesive property, adhesion under high temperature and high humidity conditions, and visibility, compared to Example 1.

TABLE 1

Composition of the resin composition in the coating liquid

| | | | | | Mass ratio ((A):(B):($C_1'$):($C_2'$):(D)) | | | | | |
|---|---|---|---|---|---|---|---|---|---|---|
| | Particle type of metal oxide particles (A) | Particle diameter (nm) of metal oxide particles (A) | Number of n in (meth)acrylate monomer ($b_1$) | Metal oxide particles (A) | Particles other than metal oxide particles (A) | Acrylic resin (B) | Acrylic resin other than acrylic resin (B) | Oxazoline-based cross linking agent component ($C_1'$) | Melamine-based cross linking agent component ($C_2'$) | Polyester resin (D) having a fluorene structure |
| Example 1 | $ZrO_2$ | 20 | 19 | 50 | — | 15 | — | 35 | — | 0 |
| Example 2 | $ZrO_2$ | 20 | 19 | 50 | — | 15 | — | 35 | — | 0 |
| Example 3 | $ZrO_2$ | 20 | 19 | 50 | — | 15 | — | 35 | — | 0 |
| Example 4 | $ZrO_2$ | 20 | 19 | 50 | — | 15 | — | 35 | — | 0 |
| Example 5 | $ZrO_2$ | 20 | 19 | 50 | — | 15 | — | — | 35 | 0 |
| Example 6 | $ZrO_2$ | 20 | 19 | 50 | — | 15 | — | — | 35 | 0 |

TABLE 1-continued

Composition of the resin composition in the coating liquid

Mass ratio ((A):(B):($C_1'$):($C_2'$):(D))

| | Particle type of metal oxide particles (A) | Particle diameter (nm) of metal oxide particles (A) | Number of n in (meth)acrylate monomer ($b_1$) | Metal oxide particles (A) | Particles other than metal oxide particles (A) | Acrylic resin (B) | Acrylic resin other than acrylic resin (B) | Oxazoline-based cross linking agent component ($C_1'$) | Melamine-based cross linking agent component ($C_2'$) | Polyester resin (D) having a fluorene structure |
|---|---|---|---|---|---|---|---|---|---|---|
| Example 7 | $ZrO_2$ | 20 | 19 | 50 | — | 15 | — | 5 | 30 | 0 |
| Example 8 | $ZrO_2$ | 20 | 19 | 50 | — | 15 | — | 15 | 20 | 0 |
| Example 9 | $ZrO_2$ | 20 | 19 | 50 | — | 15 | — | 25 | 10 | 0 |
| Example 10 | $ZrO_2$ | 20 | 19 | 50 | — | 15 | — | 30 | 5 | 0 |
| Example 11 | $ZrO_2$ | 20 | 19 | 50 | — | 15 | — | 20 | 15 | 0 |
| Example 12 | $ZrO_2$ | 20 | 19 | 50 | — | 15 | — | 10 | 25 | 0 |
| Example 13 | $TiO_2$ | 20 | 19 | 50 | — | 15 | — | 25 | 10 | 0 |
| Example 14 | ZnO | 20 | 19 | 50 | 0 | 15 | — | 25 | 10 | 0 |
| Example 15 | ITO | 20 | 19 | 50 | — | 15 | — | 25 | 10 | 0 |
| Example 16 | $Y_2O_3$ | 20 | 19 | 50 | — | 15 | — | 25 | 10 | 0 |
| Example 17 | $ZrO_2$ | 3 | 19 | 50 | — | 15 | — | 35 | — | 0 |
| Example 18 | $ZrO_2$ | 15 | 19 | 50 | — | 15 | — | 35 | — | 0 |
| Example 19 | $ZrO_2$ | 30 | 19 | 50 | — | 15 | — | 35 | — | 0 |
| Example 20 | $ZrO_2$ | 50 | 19 | 50 | — | 15 | — | 35 | — | 0 |
| Example 21 | $ZrO_2$ | 20 | 19 | 20 | — | 15 | — | 65 | — | 0 |
| Example 22 | $ZrO_2$ | 20 | 19 | 30 | — | 15 | — | 55 | — | 0 |
| Example 23 | $ZrO_2$ | 20 | 19 | 60 | — | 15 | — | 25 | — | 0 |
| Example 24 | $ZrO_2$ | 20 | 19 | 70 | — | 15 | — | 15 | — | 0 |

TABLE 2

Composition of the resin composition in the coating liquid

Mass ratio ((A):(B):($C_1'$):($C_2'$):(D))

| | Particle type of metal oxide particles (A) | Particle diameter (nm) of metal oxide particles (A) | Number of n in (meth)acrylate monomer ($b_1$) | Metal oxide particles (A) | Particles other than metal oxide particles (A) | Acrylic resin (B) | Acrylic resin other than acrylic resin (B) | Oxazoline-based cross linking agent component ($C_1'$) | Melamine-based cross linking agent component ($C_2'$) | Polyester resin (D) having a fluorene structure |
|---|---|---|---|---|---|---|---|---|---|---|
| Example 25 | $ZrO_2$ | 20 | 9 | 50 | — | 15 | — | 35 | — | 0 |
| Example 26 | $ZrO_2$ | 20 | 34 | 50 | — | 15 | — | 35 | — | 0 |
| Example 27 | $ZrO_2$ | 20 | 19 | 50 | — | 15 | — | 35 | — | 0 |
| Example 28 | $ZrO_2$ | 20 | 19 | 50 | — | 15 | — | 35 | — | 0 |
| Example 29 | $ZrO_2$ | 20 | 19 | 50 | — | 3 | — | 47 | — | 0 |
| Example 30 | $ZrO_2$ | 20 | 19 | 50 | — | 5 | — | 45 | — | 0 |
| Example 31 | $ZrO_2$ | 20 | 19 | 50 | — | 10 | — | 40 | — | 0 |
| Example 32 | $ZrO_2$ | 20 | 19 | 50 | — | 20 | — | 30 | — | 0 |
| Example 33 | $ZrO_2$ | 20 | 19 | 50 | — | 15 | — | 35 | — | 5 |
| Example 34 | $ZrO_2$ | 20 | 19 | 50 | — | 15 | — | 35 | — | 10 |
| Example 35 | $ZrO_2$ | 20 | 19 | 50 | — | 15 | — | 35 | — | 20 |
| Example 36 | $ZrO_2$ | 20 | 19 | 50 | — | 15 | — | 35 | — | 30 |
| Example 37 | $ZrO_2$ | 20 | 19 | 50 | — | 15 | — | 35 | — | 0 |
| Example 38 | $ZrO_2$ | 20 | 19 | 50 | — | 15 | — | 35 | — | 0 |
| Example 39 | $ZrO_2$ | 20 | 19 | 50 | — | 15 | — | 35 | — | 0 |
| Example 40 | $ZrO_2/TiO_2$ | 20 | 19 | 25/25 | — | 15 | — | 35 | — | 0 |
| Example 41 | $ZrO_2$ | 3 | 19 | 50 | — | 15 | — | 35 | — | 0 |
| Comparative Example 1 | $SiO_2$ | 20 | 20 | — | 50 | 15 | — | 35 | — | 0 |
| Comparative Example 2 | $MgF_2$ | 20 | 20 | — | 50 | 15 | — | 35 | — | 0 |
| Comparative Example 3 | hollow SiO2 | 20 | 20 | — | 50 | 15 | — | 35 | — | 0 |
| Comparative Example 4 | $ZrO_2$ | 2 | 20 | 50 | — | 15 | — | 35 | — | 0 |
| Comparative Example 5 | $ZrO_2$ | 70 | 20 | 50 | — | 15 | — | 35 | — | 0 |
| Comparative Example 6 | $ZrO_2$ | 150 | 20 | 50 | — | 15 | — | 35 | — | 0 |
| Comparative Example 7 | $ZrO_2$ | 20 | 8 | 45 | — | — | 10 | 35 | — | 10 |
| Comparative Example 8 | $ZrO_2$ | 20 | 35 | 45 | — | — | 10 | 35 | — | 10 |

TABLE 2-continued

Composition of the resin composition in the coating liquid

Mass ratio ((A):(B):(C$_1$'):(C$_2$'):(D))

| | Particle type of metal oxide particles (A) | Particle diameter (nm) of metal oxide particles (A) | Number of n in (meth)acrylate monomer (b$_1$) | Metal oxide particles (A) | Particles other than metal oxide particles (A) | Acrylic resin (B) | Acrylic resin other than acrylic resin (B) | Oxazoline-based cross linking agent component (C$_1$') | Melamine-based cross linking agent component (C$_2$') | Polyester resin (D) having a fluorene structure |
|---|---|---|---|---|---|---|---|---|---|---|
| Comparative Example 9 | ZrO$_2$ | 20 | 20 | 45 | — | — | 10 | 35 | — | 10 |
| Comparative Example 10 | ZrO$_2$ | 20 | 20 | 45 | — | 10 | — | — | — | 45 |
| Comparative Example 11 | ZrO$_2$ | 20 | 20 | 45 | — | 10 | — | — | — | 45 |

TABLE 3

Properties of Laminated films

| | Film thickness (nm) | Reflection ratio (%) | Initial haze (%) | Transparency | Adhesion to a laminate Initial adhesive property | Adhesion under high temperature and high humidity conditions | Interference pattern Visibility |
|---|---|---|---|---|---|---|---|
| Example 1 | 20 | 6.8 | 1.0 | A | S 95 | A 85 | A |
| Example 2 | 20 | 6.7 | 1.1 | A | S 95 | A 85 | A |
| Example 3 | 20 | 6.7 | 1.1 | A | S 95 | A 85 | A |
| Example 4 | 20 | 6.7 | 1.1 | A | S 95 | A 85 | A |
| Example 5 | 20 | 6.8 | 1.0 | A | S 95 | A 85 | A |
| Example 6 | 20 | 6.7 | 1.1 | A | S 95 | A 85 | A |
| Example 7 | 20 | 6.8 | 0.7 | S | S 95 | S 95 | S |
| Example 8 | 20 | 6.8 | 0.7 | S | S 95 | S 95 | S |
| Example 9 | 20 | 6.8 | 0.7 | S | S 95 | S 95 | S |
| Example 10 | 20 | 6.8 | 0.7 | S | S 95 | S 95 | S |
| Example 11 | 20 | 6.8 | 0.7 | S | S 95 | S 95 | S |
| Example 12 | 20 | 6.8 | 0.7 | S | S 95 | S 95 | S |
| Example 13 | 20 | 6.9 | 0.7 | S | S 95 | S 95 | S |
| Example 14 | 20 | 6.6 | 1.0 | A | S 95 | A 85 | A |
| Example 15 | 20 | 6.6 | 1.0 | A | S 95 | A 85 | A |
| Example 16 | 20 | 6.5 | 1.0 | A | S 95 | A 85 | A |
| Example 17 | 20 | 6.7 | 1.2 | A | A 85 | A 85 | A |
| Example 18 | 15 | 6.7 | 1.0 | A | S 95 | A 85 | A |
| Example 19 | 30 | 6.7 | 1.0 | A | S 95 | A 85 | A |
| Example 20 | 50 | 6.7 | 1.0 | A | S 95 | A 85 | A |
| Example 21 | 20 | 6.8 | 1.0 | A | S 95 | A 85 | A |
| Example 22 | 20 | 6.8 | 1.0 | A | S 95 | A 85 | A |
| Example 23 | 20 | 6.7 | 1.1 | A | A 85 | A 85 | A |
| Example 24 | 20 | 6.7 | 1.2 | A | A 85 | A 85 | A |

Resin layer

| | Presence or absence of (A) | Presence or absence of (B) | Presence or absence of (AB) | Presence or absence of (C$_1$') | Presence or absence of (C$_2$') | Presence or absence of (C$_1$) | Presence or absence of (C$_2$) | Presence or absence of (D) |
|---|---|---|---|---|---|---|---|---|
| Example 1 | A | A | A | A | B | A | B | B |
| Example 2 | A | A | A | A | B | A | B | B |
| Example 3 | A | A | A | A | B | A | B | B |
| Example 4 | A | A | A | A | B | A | B | B |
| Example 5 | A | A | A | B | A | B | A | B |
| Example 6 | A | A | A | B | A | B | A | B |
| Example 7 | A | A | A | A | A | A | A | B |
| Example 8 | A | A | A | A | A | A | A | B |
| Example 9 | A | A | A | A | A | A | A | B |
| Example 10 | A | A | A | A | A | A | A | B |
| Example 11 | A | A | A | A | A | A | A | B |
| Example 12 | A | A | A | A | A | A | A | B |
| Example 13 | A | A | A | A | A | A | A | B |
| Example 14 | A | A | A | A | A | A | A | B |
| Example 15 | A | A | A | A | A | A | A | B |
| Example 16 | A | A | A | A | A | A | A | B |

TABLE 3-continued

| | | | | | | | | |
|---|---|---|---|---|---|---|---|---|
| Example 17 | A | A | A | A | B | A | B | B |
| Example 18 | A | A | A | A | B | A | B | B |
| Example 19 | A | A | A | A | B | A | B | B |
| Example 20 | A | A | A | A | B | A | B | B |
| Example 21 | A | A | A | A | B | A | B | B |
| Example 22 | A | A | A | A | B | A | B | B |
| Example 23 | A | A | A | A | B | A | B | B |
| Example 24 | A | A | A | A | B | A | B | B |

TABLE 4

Properties of Laminated films

| | Film thickness (nm) | Reflection ratio (%) | Initial haze (%) | Transparency | Adhesion to a laminate — Initial adhesive property | Adhesion under high temperature and high humidity conditions | Interference pattern Visibility |
|---|---|---|---|---|---|---|---|
| Example 25 | 20 | 6.8 | 1.0 | A | S 95 | A 85 | A |
| Example 26 | 20 | 6.8 | 1.0 | A | S 95 | A 85 | A |
| Example 27 | 20 | 6.8 | 1.0 | A | S 95 | A 85 | A |
| Example 28 | 20 | 6.8 | 1.0 | A | S 95 | A 85 | A |
| Example 29 | 20 | 6.8 | 1.2 | A | S 95 | A 85 | A |
| Example 30 | 20 | 6.7 | 1.2 | A | S 95 | A 85 | A |
| Example 31 | 20 | 6.7 | 1.0 | A | S 95 | A 85 | A |
| Example 32 | 20 | 6.6 | 1.0 | A | S 95 | A 85 | A |
| Example 33 | 20 | 6.8 | 1.0 | A | S 95 | A 85 | A |
| Example 34 | 20 | 6.7 | 1.0 | A | S 95 | A 85 | A |
| Example 35 | 20 | 6.8 | 1.0 | A | S 95 | S 95 | S |
| Example 36 | 20 | 6.9 | 1.0 | A | S 95 | S 95 | S |
| Example 37 | 20 | 6.8 | 1.0 | A | S 95 | A 85 | A |
| Example 38 | 20 | 6.8 | 1.0 | A | S 95 | A 85 | A |
| Example 39 | 20 | 6.8 | 1.0 | A | S 95 | A 85 | A |
| Example 40 | 20 | 6.9 | 0.7 | S | S 95 | S 95 | S |
| Example 41 | 10 | 6.9 | 0.7 | S | S 95 | A 85 | S |
| Comparative Example 1 | 40 | 4.3 | 1.0 | A | S 95 | A 85 | C |
| Comparative Example 2 | 40 | 4.1 | 1.0 | A | S 95 | A 85 | C |
| Comparative Example 3 | 40 | 4.0 | 1.0 | A | S 95 | A 85 | C |
| Comparative Example 4 | 20 | 5.0 | 3.5 | C | C 10 | C 0 | C |
| Comparative Example 5 | 70 | 5.9 | 2.4 | C | C 30 | C 20 | C |
| Comparative Example 6 | 150 | 5.9 | 3.0 | C | C 20 | C 0 | C |
| Comparative Example 7 | 20 | 5.0 | 3.5 | C | C 10 | C 0 | C |
| Comparative Example 8 | 20 | 4.8 | 4.0 | C | C 0 | C 0 | C |
| Comparative Example 9 | 20 | 4.8 | 4.0 | C | C 0 | C 0 | C |
| Comparative Example 10 | 20 | 5.0 | 3.5 | C | C 10 | C 0 | C |
| Comparative Example 11 | 20 | 5.0 | 3.5 | C | C 10 | C 0 | C |

| | Resin layer | | | | | | | |
|---|---|---|---|---|---|---|---|---|
| | Presence or absence of (A) | Presence or absence of (B) | Presence or absence of (AB) | Presence or absence of $(C_1')$ | Presence or absence of $(C_2')$ | Presence or absence of $(C_1)$ | Presence or absence of $(C_2)$ | Presence or absence of (D) |
| Example 25 | A | A | A | A | B | A | B | B |
| Example 26 | A | A | A | A | B | A | B | B |
| Example 27 | A | A | A | A | B | A | B | B |
| Example 28 | A | A | A | A | B | A | B | B |
| Example 29 | A | A | A | A | B | A | B | B |
| Example 30 | A | A | A | A | B | A | B | B |
| Example 31 | A | A | A | A | B | A | B | B |
| Example 32 | A | A | A | A | B | A | B | B |
| Example 33 | A | A | A | A | B | A | B | A |
| Example 34 | A | A | A | A | B | A | B | A |
| Example 35 | A | A | A | A | B | A | B | A |
| Example 36 | A | A | A | A | B | A | B | A |
| Example 37 | A | A | A | A | B | A | B | B |
| Example 38 | A | A | A | A | B | A | B | B |
| Example 39 | A | A | A | A | B | A | B | B |
| Example 40 | A | A | A | A | B | A | B | B |
| Example 41 | A | A | A | A | B | A | B | B |
| Comparative Example 1 | B | A | A | A | B | A | B | B |
| Comparative Example 2 | B | A | A | A | B | A | B | B |
| Comparative Example 3 | B | A | A | A | B | A | B | B |
| Comparative Example 4 | A | A | A | A | B | A | B | B |

TABLE 4-continued

| | | | | | | | | |
|---|---|---|---|---|---|---|---|---|
| Comparative Example 5 | A | A | A | A | B | A | B | B |
| Comparative Example 6 | A | A | A | A | B | A | B | B |
| Comparative Example 7 | A | B | B | A | B | A | B | A |
| Comparative Example 8 | A | B | B | A | B | A | B | A |
| Comparative Example 9 | A | B | B | A | B | A | B | A |
| Comparative Example 10 | A | A | A | B | B | B | B | A |
| Comparative Example 11 | A | A | A | B | B | B | B | A |

INDUSTRIAL APPLICABILITY

The present invention relates to a laminated film excellent in transparency, suppression of interference pattern upon lamination of a high refractive index hard coat layer, adhesive property to a high refractive index hard coat layer, adhesion under high temperature and high humidity conditions (adhesion under high temperature and high humidity conditions), which laminated film can be used in adhesive optical films for display applications.

The invention claimed is:

1. A laminated film comprising a polyester film having a resin layer on at least one side thereof,
wherein said resin layer has a thickness of from 10 to 50 nm and contains at least:
  metal oxide particles (A) having a number average particle diameter of 3 nm or more and 50 nm or less,
  an acrylic resin (B),
  an oxazoline-based compound ($C_1'$) and/or a melamine-based compound ($C_2'$), and
  a polyester resin (D) having a fluorene structure,
wherein said acrylic resin (B) contains a monomer unit ($b_1$) represented by Formula (1), a monomer unit ($b_2$) represented by Formula (2), and a monomer unit ($b_3$) represented by Formula (3):

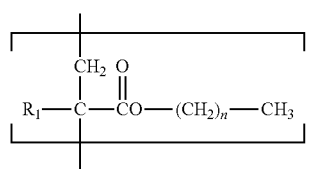

Formula (1)

wherein $R_1$ represents a hydrogen atom or a methyl group; and n represents an integer of 9 or more and 34 or less;

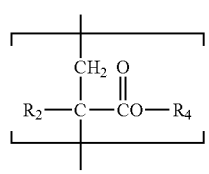

Formula (2)

wherein $R_2$ represents a hydrogen atom or a methyl group; and $R_4$ represents a group containing 2 or more saturated hydrocarbon rings; and

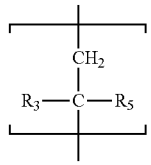

Formula (3)

wherein $R_3$ represents a hydrogen atom or a methyl group; and $R_5$ group represents a hydroxyl group, a carboxyl group, a tertiary amino group, a quaternary ammonium salt group, a sulfonic acid group, or a phosphate group.

2. The laminated film according to claim 1, wherein said metal oxide particles (A) have said acrylic resin (B) on the surfaces thereof.

3. The laminated film according to claim 1, wherein said metal oxide particles (A) are titanium oxide particles ($A_1'$) and/or zirconium oxide particles ($A_2'$).

4. The laminated film according to claim 1, wherein said polyester resin (D) having a fluorene structure does not contain a dicarboxylic acid component ($Da_3$) containing a sulfonic acid group, or contains the same in an amount less than 0.1% by mole relative to the amount of a dicarboxylic acid component (Da) constituting said polyester resin (D).

5. A laminated film comprising a polyester film having a resin layer on at least one side thereof,
wherein said resin layer has a thickness of from 10 to 50 nm and contains at least:
  metal oxide particles (A) having a number average particle diameter of 3 nm or more and 50 nm or less,
  an acrylic resin (B), and
  a component ($C_1$) derived from an oxazoline-based compound and/or a component ($C_2$) derived from a melamine-based compound, and
  a polyester resin (D) having a fluorene structure,
wherein said acrylic resin (B) contains a monomer unit ($b_1$) represented by Formula (1), a monomer unit ($b_2$) represented by Formula (2), and a monomer unit ($b_3$) represented by Formula (3):

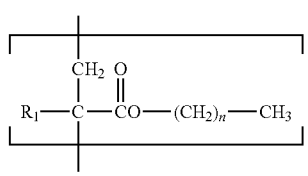

Formula (1)

wherein $R_1$ represents a hydrogen atom or a methyl group; and n represents an integer of 9 or more and 34 or less;

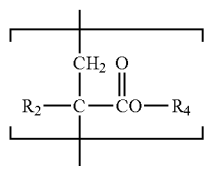

Formula (2)

wherein $R_2$ represents a hydrogen atom or a methyl group; and $R_4$ group represents a group containing 2 or more saturated hydrocarbon rings;

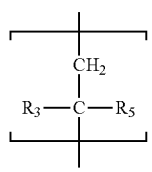

Formula (3)

wherein $R_3$ represents a hydrogen atom or a methyl group; and $R_5$ group represents a hydroxyl group, a carboxyl group, a tertiary amino group, a quaternary ammonium salt group, a sulfonic acid group, or a phosphate group.

6. A method for producing a laminated film comprising forming a resin layer(s) on at least one side of a polyester film, wherein said method comprises:

forming a resin on at least one side of the polyester film using the following resin composition to form a laminated film;

then stretching said laminated film at least uniaxially; and then subjecting said laminated film to heat treatment, wherein said resin composition contains at least metal oxide particles (A) having a number average particle diameter of 3 nm or more and 50 nm or less, and an acrylic resin (B), and an oxazoline-based compound ($C_1'$) and/or a melamine-based compound ($C_2'$), wherein said acrylic resin (B) contains a monomer unit ($b_1$) represented by Formula (1), a monomer unit ($b_2$) represented by Formula (2), and a monomer unit ($b_3$) represented by Formula (3):

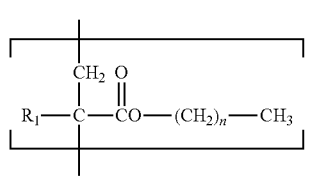

Formula (1)

wherein $R_1$ group represents a hydrogen atom or a methyl group; and n represents an integer of 9 or more and 34 or less;

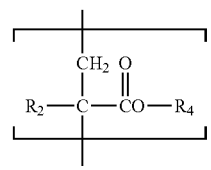

Formula (2)

wherein $R_2$ represents a hydrogen atom or a methyl group; and $R_4$ group represents a group containing 2 or more saturated hydrocarbon rings;

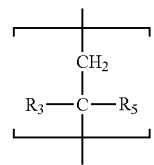

Formula (3)

wherein $R_3$ represents a hydrogen atom or a methyl group; and $R_5$ group represents a hydroxyl group, a carboxyl group, a tertiary amino group, a quaternary ammonium salt group, a sulfonic acid group, or a phosphate group.

7. The method for producing the laminated film according to claim 6, wherein said acrylic resin (B) is formed by polymerization using a (meth)acrylate monomer ($b_1'$) represented by Formula (4), a (meth)acrylate monomer ($b_2'$) represented by Formula (5), and a (meth)acrylate monomer ($b_3'$) represented by Formula (6):

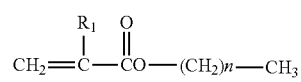

Formula (4)

wherein $R_1$ represents a hydrogen atom or a methyl group; and n represents an integer of 9 or more and 34 or less;

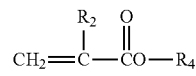

Formula (5)

wherein $R_2$ represents a hydrogen atom or a methyl group; and $R_4$ group represents a group containing 2 or more saturated hydrocarbon rings;

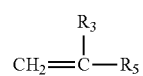

Formula (6)

wherein $R_3$ represents a hydrogen atom or a methyl group; and $R_5$ group represents a hydroxyl group, a carboxyl group, a tertiary amino group, a quaternary ammonium salt group, a sulfonic acid group, or a phosphate group.

8. The method for producing the laminated film according to claim 6, wherein said metal oxide particles (A) were subjected to a surface treatment with said acrylic resin (B).

9. The method for producing the laminated film according claim 6, wherein said metal oxide particles (A) are titanium oxide particles ($A_1'$) and/or zirconium oxide particles ($A_2'$).

10. The method for producing the laminated film according to claim 6, wherein said resin composition contains a polyester resin (D) having a fluorene structure.

11. The method for producing the laminated film according to claim 10, wherein said polyester resin (D) does not contain a dicarboxylic acid component ($Da_3$) containing a sulfonic acid group, or contains the same in an amount less than 0.1% by mole relative to the amount of dicarboxylic acid component (Da) constituting said polyester resin (D).

12. The method for producing the laminated film according to claim 6, wherein said resin layer is formed by coating to a thickness of from 10 to 50 nm after drying.

\* \* \* \* \*